(12) United States Patent
Nelson et al.

(10) Patent No.: US 8,505,234 B2
(45) Date of Patent: *Aug. 13, 2013

(54) INSERT FOR USE WITH A PEST STATION

(75) Inventors: Thomas D. Nelson, Maplewood, MN (US); William J. Pattison, St. Paul, MN (US); Joshua James Lanz, St. Paul, MN (US); Bryan John Henneman, Woodbury, MN (US); Roberta L. Frederick, Champlin, MN (US); James J. Tarara, Woodbury, MN (US)

(73) Assignee: Ecolab USA Inc., St. Paul, MN (US)

( * ) Notice: Subject to any disclaimer, the term of this patent is extended or adjusted under 35 U.S.C. 154(b) by 361 days.

This patent is subject to a terminal disclaimer.

(21) Appl. No.: 12/613,182

(22) Filed: Nov. 5, 2009

(65) Prior Publication Data
US 2010/0050498 A1    Mar. 4, 2010

Related U.S. Application Data

(62) Division of application No. 11/857,602, filed on Sep. 19, 2007.

(60) Provisional application No. 60/826,703, filed on Sep. 22, 2006.

(51) Int. Cl.
| | |
|---|---|
| *A01M 23/08* | (2006.01) |
| *A01M 23/00* | (2006.01) |
| *A01M 23/30* | (2006.01) |
| *A01M 1/14* | (2006.01) |
| *A01M 25/00* | (2006.01) |
| *A01M 23/18* | (2006.01) |

(52) U.S. Cl.
USPC .............. 43/67; 43/65; 43/58; 43/81; 43/114; 43/131

(58) Field of Classification Search
USPC ............................ 43/114, 58, 64–67, 81, 131
See application file for complete search history.

(56) References Cited

U.S. PATENT DOCUMENTS

| 134,539 | A | * | 1/1873 | Greene | .............................. 43/66 |
| 179,940 | A | * | 7/1876 | Morris | ................................ 43/67 |

(Continued)

FOREIGN PATENT DOCUMENTS

| JP | 02276525 | A | * | 11/1990 |
| JP | 2004008101 | A | * | 1/2004 |
| WO | WO 2007/026123 | A1 | | 3/2007 |

OTHER PUBLICATIONS

"Victor™ Tin Cat Repeating Mouse Trap, Solid Top", www.victorpest.com, 1 pg. (© 2001 Woodstream Corporation).

(Continued)

*Primary Examiner* — Darren W Ark
(74) *Attorney, Agent, or Firm* — IPLM Group, P.A.

(57) ABSTRACT

A versatile pest station for use with interchangeable inserts includes a housing, a lock mechanism, a first insert, and a second insert. The housing includes a base, a lid, and an opening. The base and the lid form a cavity, and the opening provides access to the cavity. The base has a bottom surface and is configured and arranged to be securely mounted to a surface. The lock mechanism interlocks the base and the lid. The first insert is configured and arranged to fit within the cavity, and the first insert includes an entrance mechanism. The second insert is configured and arranged to fit within the cavity, and the second insert includes a snap trap. The first insert and the second insert are interchangeable for individual use with the housing, and the first insert and the second insert are elevated relative to the bottom surface of the base.

20 Claims, 26 Drawing Sheets

(56) References Cited

U.S. PATENT DOCUMENTS

| | | | |
|---|---|---|---|
| 649,484 A * | 5/1900 | Schlachter et al. | 43/65 |
| 760,738 A * | 5/1904 | Huguley | 43/67 |
| 892,368 A | 6/1908 | Davis | |
| 1,019,518 A * | 3/1912 | Paull | 43/67 |
| 1,085,599 A * | 2/1914 | Frost | 43/65 |
| 1,168,252 A * | 1/1916 | Erdley | 43/65 |
| 1,233,332 A | 7/1917 | Erickson | |
| 1,349,177 A * | 8/1920 | Wiemer | 43/81 |
| 1,363,626 A * | 12/1920 | Thomas | 43/66 |
| 1,461,681 A | 7/1923 | Schuckman | |
| 1,511,123 A * | 10/1924 | Hart | 43/81 |
| 1,602,677 A * | 10/1926 | Jorgensen | 43/67 |
| 1,716,196 A * | 6/1929 | Swanson | 43/65 |
| 1,738,623 A * | 12/1929 | Westerlund | 43/66 |
| 1,792,774 A * | 2/1931 | Snider | 43/81 |
| 1,860,599 A * | 5/1932 | Schiltz | 43/66 |
| 2,122,147 A * | 6/1938 | Lamp | 43/67 |
| 2,126,512 A * | 8/1938 | Stemen | 43/65 |
| 2,332,334 A * | 10/1943 | Morrison | 43/81 |
| 2,496,708 A * | 2/1950 | Fuller | 43/67 |
| 2,568,168 A | 9/1951 | Query | |
| 2,635,382 A | 4/1953 | Kuntz | |
| 2,643,480 A | 6/1953 | Jones | |
| 2,752,722 A * | 7/1956 | Gardner | 43/61 |
| 2,781,607 A | 2/1957 | Smiley | |
| 3,015,184 A | 1/1962 | Scott et al. | |
| 3,269,052 A | 8/1966 | Barnhart | |
| 3,298,128 A | 1/1967 | Dill et al. | |
| 3,303,600 A | 2/1967 | Freeman | |
| 3,415,006 A * | 12/1968 | Gilbaugh | 43/67 |
| 3,517,454 A | 6/1970 | Query | |
| 3,585,750 A * | 6/1971 | Routt | 43/61 |
| 3,786,591 A * | 1/1974 | Morford | 43/66 |
| 3,900,983 A * | 8/1975 | Petrosky | 43/58 |
| 4,026,064 A * | 5/1977 | Baker | 43/131 |
| 4,030,230 A | 6/1977 | Souza | |
| 4,062,142 A | 12/1977 | Marotti | |
| 4,103,448 A * | 8/1978 | Souza | 43/67 |
| 4,138,796 A | 2/1979 | Souza | |
| 4,157,628 A * | 6/1979 | Saslove | 43/65 |
| 4,161,079 A * | 7/1979 | Hill | 43/114 |
| 4,182,070 A | 1/1980 | Connelly | |
| 4,208,828 A * | 6/1980 | Hall et al. | 43/114 |
| 4,214,399 A * | 7/1980 | Bradley | 43/66 |
| 4,238,903 A | 12/1980 | Mazzei | |
| 4,270,299 A * | 6/1981 | Long | 43/58 |
| 4,349,982 A | 9/1982 | Sherman | |
| 4,418,493 A * | 12/1983 | Jordan | 43/67 |
| 4,453,337 A | 6/1984 | Williams | |
| 4,541,198 A * | 9/1985 | Sherman | 43/131 |
| 4,550,523 A | 11/1985 | Spiller | |
| 4,619,071 A | 10/1986 | Willis | |
| 4,658,536 A | 4/1987 | Baker | |
| 4,719,718 A | 1/1988 | Kon | |
| 4,835,902 A * | 6/1989 | Sherman | 43/131 |
| 4,887,381 A * | 12/1989 | Tieben | 43/66 |
| 5,040,327 A | 8/1991 | Stack et al. | |
| 5,448,852 A | 9/1995 | Spragins et al. | |
| 5,471,781 A * | 12/1995 | Vine | 43/69 |
| D385,611 S | 10/1997 | Prince et al. | |
| 5,682,705 A * | 11/1997 | Stahl | 43/66 |
| 5,806,237 A * | 9/1998 | Nelson et al. | 43/131 |
| 5,921,018 A * | 7/1999 | Hirose et al. | 43/131 |
| 5,930,944 A * | 8/1999 | Knuppel | 43/114 |
| 5,943,817 A * | 8/1999 | Miller | 43/131 |
| 5,953,853 A | 9/1999 | Kim | |
| 5,979,105 A * | 11/1999 | Marks | 43/66 |
| 6,016,623 A | 1/2000 | Celestine | 43/69 |
| 6,088,948 A * | 7/2000 | Rønnau | 43/64 |
| 6,145,242 A * | 11/2000 | Simpson | 43/131 |
| 6,164,010 A * | 12/2000 | Snell et al. | 43/114 |
| 6,202,339 B1 * | 3/2001 | Knuppel | 43/114 |
| 6,202,340 B1 | 3/2001 | Nieves | |
| 6,212,819 B1 | 4/2001 | Edwards | |
| 6,263,612 B1 | 7/2001 | Shultz | |
| 6,266,917 B1 * | 7/2001 | Hight | 43/114 |
| 6,370,813 B1 * | 4/2002 | Nelson et al. | 43/131 |
| 6,389,738 B1 * | 5/2002 | Denny et al. | 43/58 |
| 6,397,517 B1 * | 6/2002 | Leyerle et al. | 43/58 |
| 6,470,622 B1 | 10/2002 | Braun | |
| 6,481,151 B1 * | 11/2002 | Johnson et al. | 43/66 |
| 6,594,947 B2 | 7/2003 | Lingren et al. | |
| 6,609,328 B2 * | 8/2003 | Swift et al. | 43/98 |
| 6,618,983 B1 * | 9/2003 | Spragins | 43/114 |
| 6,622,422 B2 * | 9/2003 | Gehret et al. | 43/66 |
| 6,631,582 B2 * | 10/2003 | Knuppel et al. | 43/114 |
| 6,691,452 B1 * | 2/2004 | Knuppel et al. | 43/64 |
| 6,694,669 B2 * | 2/2004 | Gehret et al. | 43/61 |
| 6,874,274 B2 * | 4/2005 | Townsend | 43/114 |
| 6,901,694 B1 * | 6/2005 | Neault et al. | 43/131 |
| 6,955,007 B2 * | 10/2005 | Gehret et al. | 43/61 |
| 6,990,766 B2 * | 1/2006 | Gehret et al. | 43/61 |
| 7,026,942 B2 | 4/2006 | Cristofori et al. | |
| 7,509,770 B2 * | 3/2009 | Gardner et al. | 43/114 |
| 7,874,098 B2 | 1/2011 | Vickery et al. | |
| 7,913,447 B1 * | 3/2011 | Jabro | 43/66 |
| 7,980,023 B2 * | 7/2011 | Nelson et al. | 43/67 |
| 8,028,468 B1 * | 10/2011 | Walsh et al. | 43/131 |
| 8,302,345 B2 * | 11/2012 | Nelson et al. | 43/67 |
| 2001/0001353 A1 | 5/2001 | Jones | |
| 2001/0017001 A1 | 8/2001 | Leverton | |
| 2001/0033230 A1 | 10/2001 | Barber et al. | |
| 2002/0043018 A1 * | 4/2002 | Townsend | 43/131 |
| 2002/0046483 A1 | 4/2002 | Snell et al. | |
| 2002/0046512 A1 | 4/2002 | Roberts | |
| 2002/0178648 A1 | 12/2002 | Frasier | |
| 2002/0184811 A1 | 12/2002 | Wright | |
| 2003/0014902 A1 | 1/2003 | Draper | |
| 2003/0019148 A1 | 1/2003 | Kao et al. | |
| 2003/0029076 A1 | 2/2003 | Snell et al. | |
| 2003/0069697 A1 | 4/2003 | Mafra-Neto et al. | |
| 2003/0074832 A1 | 4/2003 | Snell | |
| 2003/0084603 A1 | 5/2003 | Lafforthun | |
| 2003/0089025 A1 | 5/2003 | Maffo et al. | |
| 2003/0126786 A1 | 7/2003 | Emond | |
| 2003/0131522 A1 | 7/2003 | Swift et al. | |
| 2003/0152604 A1 | 8/2003 | Sutherland et al. | |
| 2003/0182846 A1 | 10/2003 | Nelson et al. | |
| 2004/0025410 A1 * | 2/2004 | Shapland | 43/65 |
| 2005/0102887 A1 * | 5/2005 | Lang et al. | 43/64 |
| 2006/0053682 A1 * | 3/2006 | Goldstein | 43/67 |
| 2006/0156617 A1 * | 7/2006 | Hale | 43/81 |
| 2009/0229169 A1 * | 9/2009 | Weisberg et al. | 43/67 |
| 2010/0162614 A1 * | 7/2010 | Cink et al. | 43/58 |
| 2010/0170141 A1 | 7/2010 | Cink et al. | |
| 2011/0016769 A1 * | 1/2011 | Cink et al. | 43/65 |
| 2011/0258907 A1 * | 10/2011 | Endepols et al. | 43/131 |

OTHER PUBLICATIONS

"CheckPointe® Bait Station", www.ecolab.com, 1 pg. (© Ecolab Inc.) (1996).

"Snap-E® Mousetrap", www.kness.com, 3 pgs. (Kness Mfg. Co., Inc.), (Known of prior to Sep. 2007).

"Ecolab® EcoPro™ Concepts—Electronic Kill", 1 pg. (Ecolab Inc.) (2005).

"Repeater™—Multiple Catch Mouse Trap", JT Eaton, 2 pgs. (2001).

"Retrofitting Rodent Bait Stations", *PCT—Pest Control Technology*, pp. 30, 34, 36 (Aug. 2006).

"CheckPoint® Rodent Program", ECOLAB® Pest Elimination—Ecolab Inc., 2 pages (© 2004 Ecolab Inc.).

"Protecta® Bait Station", Bell Laboratories, Inc., www.belllabs.com, 1 page (Known of prior to Sep. 2007).

"Protecta® LP", Bell Laboratories, Inc., www.belllabs.com, 1 page (Known of prior to Sep. 2007).

"Protecta® mouse", Bell Laboratories, Inc., www.belllabs.com, 1 page (Known of prior to Sep. 2007).

"Protecta® Pest Monitor", Bell Laboratories, Inc., www.belllabs.com, 1 page (Known of prior to Sep. 2007).

"Protecta® RTU", Bell Laboratories, Inc., www.belllabs.com, 1 page (Known of prior to Sep. 2007).

"Protecta® Sidewinder®", Bell Laboratories, Inc., www.belllabs.com, 1 page (Known of prior to Sep. 2007).

"Rodent Baiters®", Bell Laboratories, Inc., www.belllabs.com, 1 page (Known of prior to Sep. 2007).

"Bait Trays", Bell Laboratories, Inc., www.belllabs.com, 1 page (Known of prior to Sep. 2007).

"SecureChoice Multiplex® Station", Syngenta Group Company, www.securechoice.us, 2 pages (© 2007 Syngenta).

"Mechanical Bait Products—For the Control of Rats and Mice", Multiplex™ Bait Station, 1 page, www.neogen.com/AnimalSafety/pdf/ProdInfo/Rodenticide/Page_20.pdf. (Known of prior to Sep. 2007).

* cited by examiner

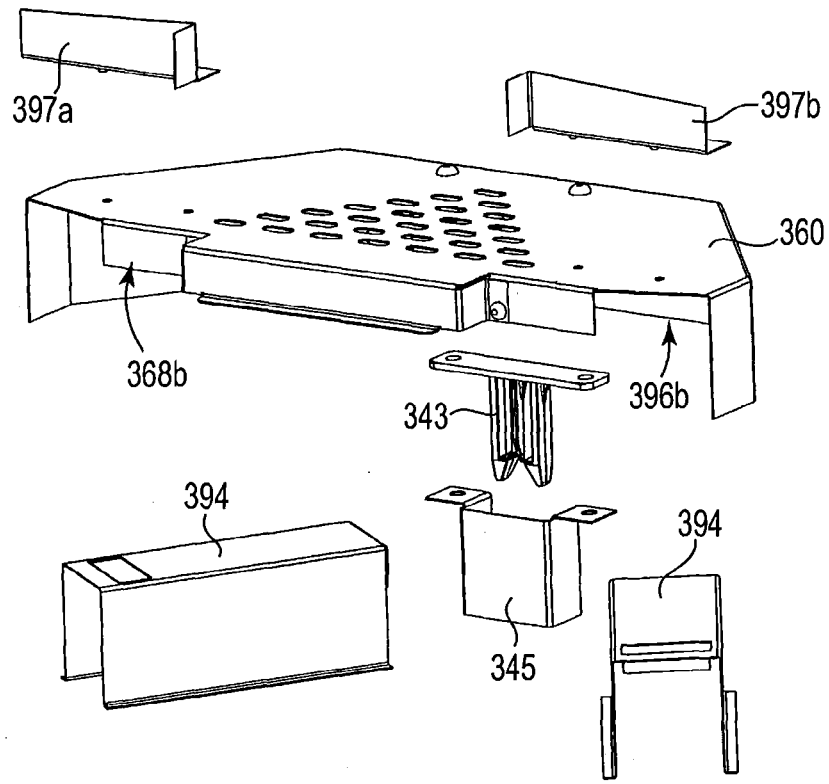
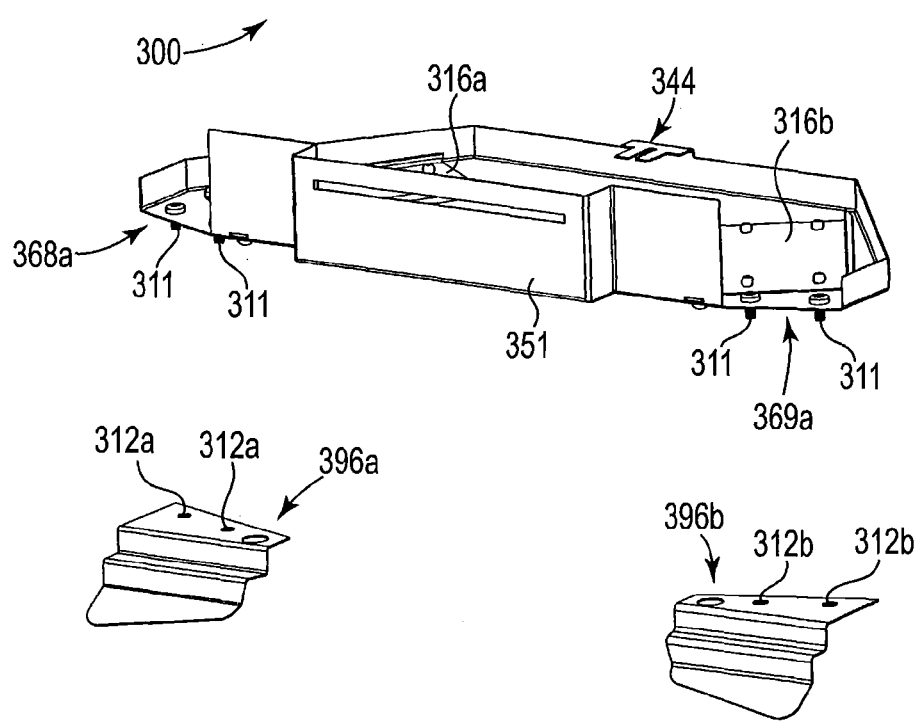
Fig. 26

INSERT FOR USE WITH A PEST STATION

This application claims priority to U.S. Nonprovisional patent application Ser. No. 11/857,602, filed Sep. 19, 2007, now U.S. Pat. No. 7,980,023, issued Jul. 19, 2011, entitled "Versatile Pest Station with Interchangeable Inserts" and U.S. Provisional Application Ser. No. 60/826,703, filed Sep. 22, 2006, entitled "Versatile Rodent Trap with Interchangeable Inserts", which are incorporated herein by reference in their entireties.

FIELD OF THE INVENTION

This application relates to a versatile pest station with interchangeable inserts.

BACKGROUND OF THE INVENTION

Pest stations have been used to securely hold trap mechanisms and baits to protect facilities from invasion and infestation of rodents such as rats and mice, insects, and other pests. Use of baits is a historically robust and effective approach to protecting facilities from pests. Recently, legislative and consumer interests have challenged the pest management industry to rely less on poisonous baits and to identify other solutions, primarily through monitoring and trapping. The cost of replacing pest stations with other devices is, however, quite high and discourages adoption of such other solutions. The present invention addresses the problems associated with the prior art devices and provides for a versatile pest station with interchangeable inserts.

SUMMARY OF THE INVENTION

One aspect of the present invention provides a versatile pest station for use with interchangeable inserts including a housing, a lock mechanism, a first insert, and a second insert. The housing includes a base, a lid, and an opening. The base and the lid form a cavity, and the opening provides access to the cavity. The base has a bottom surface and is configured and arranged to be securely mounted to a surface. The lock mechanism interlocks the base and the lid. The first insert is configured and arranged to fit within the cavity, and the first insert includes an entrance mechanism. The second insert is configured and arranged to fit within the cavity, and the second insert includes a snap trap. The first insert and the second insert are interchangeable for individual use with the housing, and the first insert and the second insert are elevated relative to the bottom surface of the base.

Another aspect of the present invention provides an insert for use with a pest station, the pest station including a station housing having a station cavity. The insert includes an insert housing, an entrance mechanism, and an access member. The insert housing includes a base, a lid, and an opening. The base and the lid form an insert cavity configured and arranged to contain a pest, and the opening provides access to the insert cavity. The entrance mechanism is proximate the opening, and the entrance mechanism allows entrance into the insert cavity and prevents exit out of the insert cavity. The access member is releasably connectable to the insert housing proximate the opening. The insert housing may be used individually by detaching the access member from the insert housing, and the insert housing may be used with the pest station by placing the insert housing within the station cavity.

Another aspect of the present invention provides an insert for use with a pest station, the pest station including a station housing having a station cavity. The insert includes an insert housing, a first snap trap, and a second snap trap. The insert housing is configured and arranged to fit within the station cavity. The insert housing has a base, sides, and a front portion. The base has a front and a rear. The base and the sides form an insert cavity, and the front portion allows access to the insert cavity. The base is inclined from proximate the front to proximate the rear and includes a connecting member. The first snap trap and a second snap trap are positioned within the insert cavity and releasably kept in place by the connecting member. The connecting member prevents the first snap trap and the second snap trap from sliding off the base. The releasable connections between the first and second snap traps and the connecting member reduces activation of the second snap trap when the first snap trap is activated.

Another aspect of the present invention provides a method of interchanging inserts in a pest station. A lock mechanism interlocking a lid to a base of a pest station is unlocked and the lid is opened. A first insert including an entrance mechanism is removed from a cavity of the pest station. A second insert including a first snap trap and a second snap trap is placed within the cavity of the pest station. The lid is closed, and the locking mechanism is secured to interlock the lid to the base.

BRIEF DESCRIPTION OF THE DRAWINGS

FIG. 26 is an exploded rear perspective view of the insert shown in FIG. 22.

DETAILED DESCRIPTION OF A PREFERRED EMBODIMENT

Figure 1:
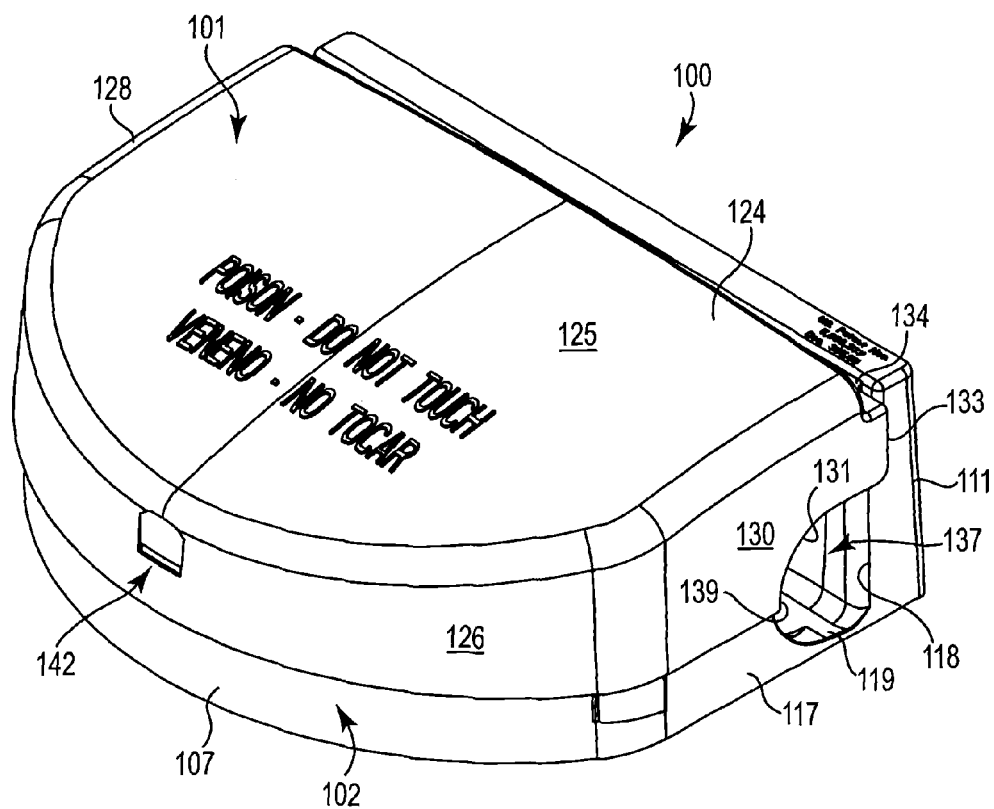
FIG. 1 is a front perspective view of a versatile pest station constructed according to the principles of the present invention.
Figure 2:
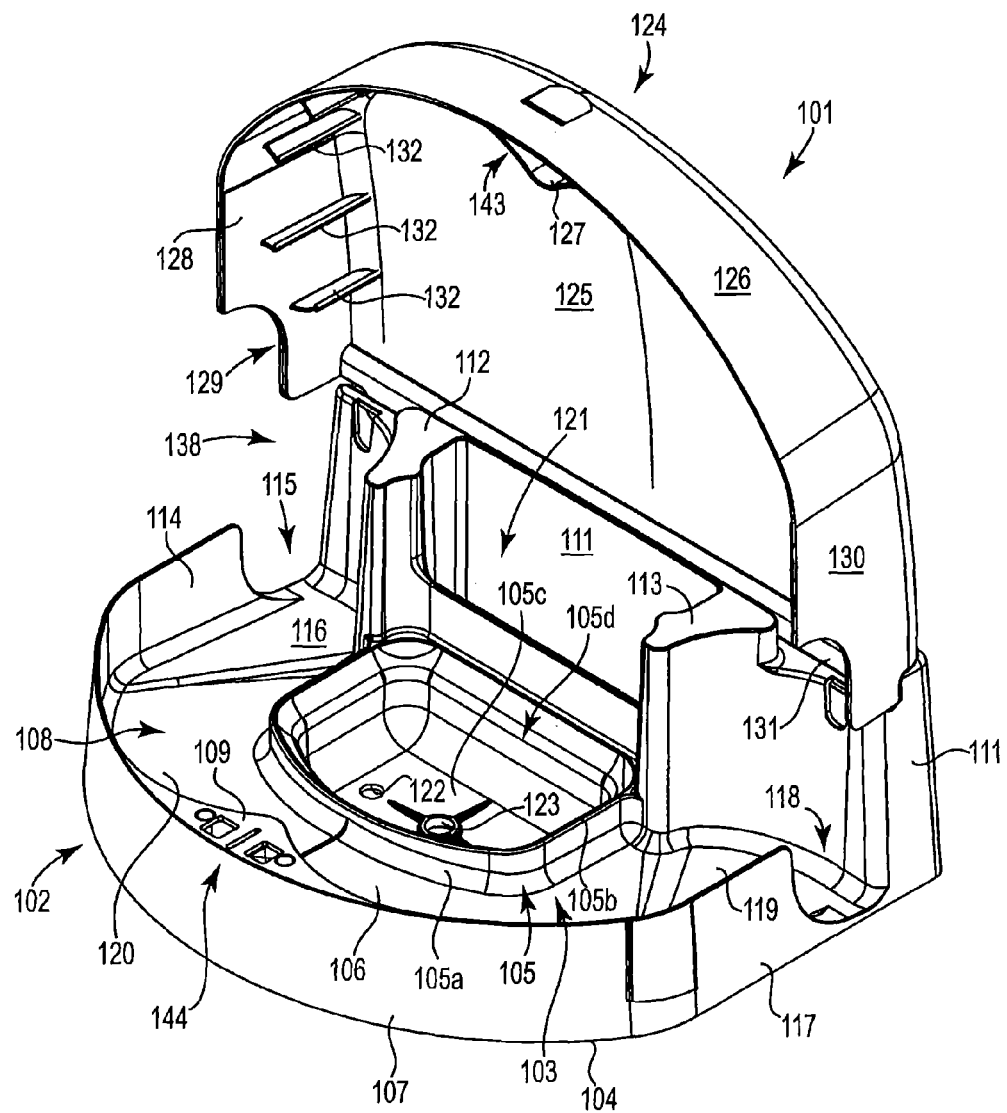
FIG. 2 is a front perspective view of the versatile pest station shown in FIG. 1 with an opened lid.
Figure 3:
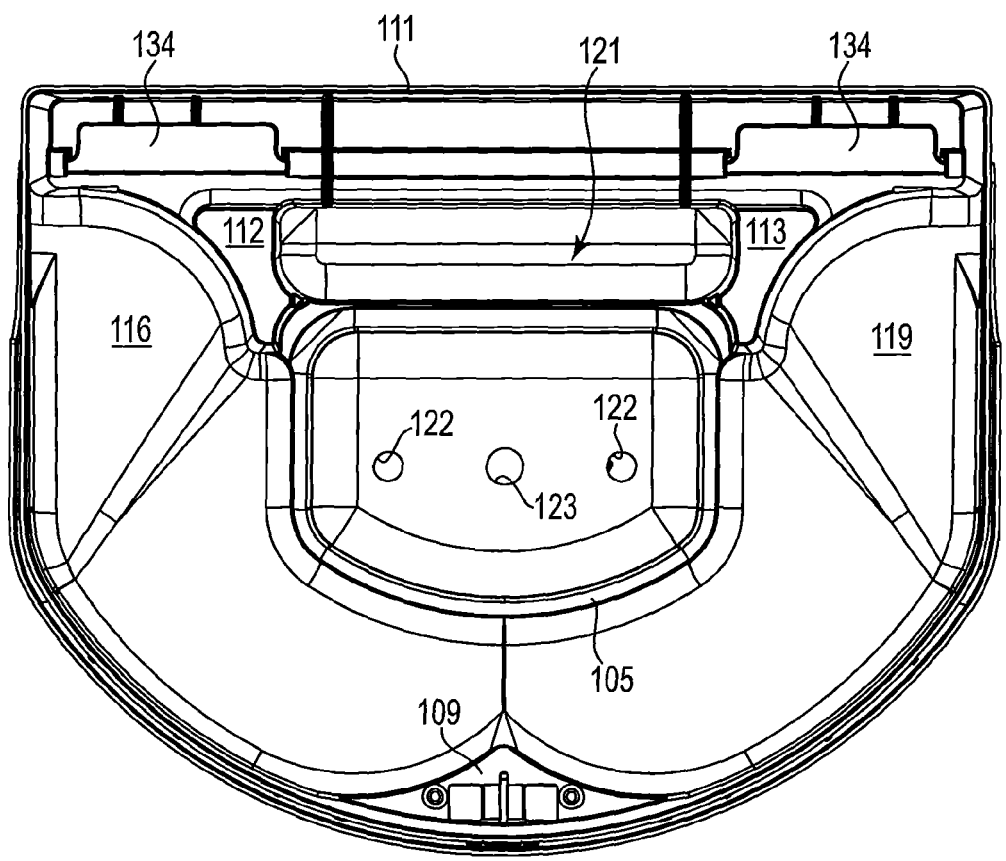
FIG. 3 is a top view of a base of the versatile pest station shown in FIG. 1.

A versatile pest station with interchangeable inserts constructed according to the principles of the present invention is designated by the numeral 100 in the drawings.

The versatile pest station 100 includes a housing 101 that could have a variety of discreet appearances such as resembling grass, rocks, vents, and other items so as to blend into its environment. The housing 101, shown in FIGS. 1-5, includes a base 102 and a lid 124 that form a cavity 137 in which interchangeable inserts and pests are contained.

The base 102 includes a bottom portion 103 and sides 114 and 117 interconnecting a front wall 107 and a rear wall 111 extending upward from the bottom portion 103. The front wall 107, the sides 114 and 117, and the rear wall 111 form an opening 120 into a cavity 108 of the base 102. The bottom portion 103 includes a pan 105 proximate a middle portion of its inner surface within the cavity 108. The pan 105 includes an upstanding wall portion 105a with a top 105b, and the upstanding wall portion 105a defines a pan cavity 105d. The bottom 105c of the pan 105 includes drain apertures 122 and an aperture 123 through which a fastener, such as a nail or a screw, could be inserted to secure the base 102 to a surface, such as a floor or the ground. An elevated platform 106 surrounds the pan 105 proximate the front wall 107 and the sides 114 and 117 and is elevated relative to a bottom surface 104 of the bottom portion 103 and the bottom of the pan 105. The sides 114 and 117 include notches 115 and 118, respectively, proximate the rear wall 111. Inclined passageways 116 and 119 provide a ramp from proximate the surface and the notches 115 and 118, respectively, to the elevated platform 106. The top 105b of the upstanding wall portion 105a is elevated relative to the bottom 105c of the pan 105 and opening bottoms defined by notches 115 and 118. Between the rear wall 111 and the pan 105 is a receptacle 121 configured and arranged to hold maintenance records.

The front wall 107 includes a protrusion 109 that extends inward toward the pan 105 and includes a female portion 144 of a lock mechanism 142. The rear wall 111 includes protrusions 112 and 113 extending inward toward the pan 105. The protrusion 112 is proximate the juncture of the inclined passageway 116, the elevated platform 106, and the pan 105. The protrusion 113 is proximate the juncture of the inclined passageway 119, the elevated platform 106, and the pan 105. The rear wall 111 is preferably higher than the front wall 107 and includes apertures 111a through which fasteners, such as nails or screws, could be inserted to secure the rear wall 111 to a surface such as a wall.

The lid 124 includes a top plate 125 and sides 128 and 130 interconnecting a front wall 126 and a rear wall 133. The rear wall 133 is operatively connected to the rear wall 111 of the base 102 with a hinge 134, and the lid 124 may be pivoted about the hinge 134 to open and close the lid 124. The front wall 126 includes a protrusion 127 that extends inward and includes a male portion 143 of the lock mechanism 142 that corresponds with the female portion 144 on the front wall 107 of the base 102. The first side 128 includes a first notch 129 proximate the rear wall 133 corresponding with the first notch 115 of the base 102 to form an opening 138 when the lid 124 is closed. The second side 130 includes a second notch 131 proximate the rear wall 133 corresponding with the second notch 118 of the base 102 to form an opening 139 when the lid 124 is closed. The sides 128 and 130 also preferably include protrusions 132 extending inward and downward to stabilize the inserts, such as insert 150, between the base 102 and the lid 124 when the lid 124 is closed. The protrusions 132 also add some strength to the lid 124.

The base 102 and the lid 124 form the cavity 137 in which interchangeable inserts and pests are contained, and the first opening 138 and the second opening 139 provide access to the cavity 137.

A bottom surface 104 of the bottom portion 103 could be positioned on a surface, such as a floor or the ground, and the rear wall 111 could be positioned against a surface such as a wall. A fastener, such as a nail or a screw, could be inserted through the aperture 123 to secure the bottom portion 103 to the surface or through the apertures 111a to secure the rear wall 111 to the wall. Alternatively, the housing 101 could be placed in a corner with the front walls 107 and 126 facing the corner.

The lock mechanism 142 secures the lid 124 to the base 102, and a key (not shown) is inserted into the slot in the lid 124 to release the male portion 143 from the female portion 144. The lock mechanism 142 securing the lid 124 to the base 102 along with securing the base 102 to a surface assist in providing a tamper resistant housing 101. Further, the size of the openings 138 and 139 minimize the risk of non-targeted pests (i.e., pets and children) from accessing the cavity 137 and its contents.

The housing 101 could also include a signal mechanism indicating when a pest is trapped within the housing 101 or within the insert. Such signal mechanisms could include mechanical means and electrical means well known in the art. Mechanical means could include a spring biased flag that pops up when a pest is trapped within the housing 101 or within the insert thus providing visual indication proximate the housing. Electrical means could include sensor devices, transmitters, and receivers that send an alert via the internet to an electronic mail address or send a message to a cellular phone.

The housing 101 is similar to the housing disclosed in U.S. Pat. No. 5,806,237 to Nelson et al., which is incorporated herein by reference in its entirety, and the housing 101 is versatile as it is configured and arranged to contain a variety of inserts such as inserts 150, 170, 170', and 300.

The inserts are interchangeable for individual use with the housing 101. Each insert is elevated relative to the bottom 105c of the pan 105 and the opening bottoms defined by notches 115 and 118 when each is fitted within the cavity and rests on the top 105b of the upstanding wall portion 105a without contacting the bottom 105c of the pan 105.

A first insert 150, shown in FIGS. 6-9 and 11-13, is also versatile because it includes several optional configurations for use individually or with a bait station such as housing 101. The insert 150 is preferably made of galvanized stainless steel but could be made of other suitable materials such as plastic. The insert 150 includes a base 151 with a bottom plate 152 and a front 158, sides 153a and 153b, and a rear 157 extending upward from the bottom plate 152. The bottom plate 152 preferably includes six sides, and the sides adjacent the rear 157 do not have walls extending upward therefrom and therefore form openings 168a and 169a between the rear 157 and the sides 153a and 153b, respectively. Proximate the opening 168a and between the side 153a and the rear 157 is a receptacle 152a, which is a tab extending upward from the bottom plate 152 creating an opening in the bottom plate 152. Proximate the opening 169a and the side 153b is a receptacle 152b, which is a tab extending upward from the bottom plate 152 creating an opening in the bottom plate 152. The tabs creating the openings are preferably three adjacent sides of a rectangle cut from the bottom plate 152 and bent upward proximate the fourth side that is not cut therefrom. The receptacles 152a and 152b are preferably rectangular shaped openings with the longitudinal axis extending parallel to the sides adjacent the rear 157.

Proximate the opening 168a are first tab 154a and second tab 155a. First tab 154a is a tab extending outward from the side 153a proximate the juncture of the side 153a and the bottom plate 152. First tab 154a is preferably three adjacent sides of a rectangle with the longest side cut from the bottom plate 152 and the adjacent sides extending from the bottom plate 152 into the side 153. The fourth side is not cut and is bent to extend outward from the side 153a. Second tab 155a is a tab extending upward from the bottom plate 152 proximate the juncture of the rear 157 and the adjacent side. Second tab 155a is preferably three adjacent sides of a rectangle cut from the bottom plate 152. The fourth side is not cut and is bent to extend upward from the bottom plate 152.

Proximate the opening 169a are first tab 154b and second tab 155b. First tab 154b is a tab extending outward from the side 153b proximate the juncture of the side 153b and the bottom plate 152. Second tab is a tab extending upward from the bottom plate 152 proximate the juncture of the rear 157 and the adjacent side. First tab 154b and second tab 155b are similarly created as first tab 154a and second tab 155a. First tab 154a and second tab 155a extend parallel to one another and first tab 154b and second tab 155b extend parallel to one another approximately the widths of the openings 168a and 169a.

Side 153a includes a receptacle 159a, and side 153b includes a receptacle 159b. Receptacle 159a is proximate the opening 168a and is created by making parallel cuts in the side 153a and bending the side 153a between the cuts inward. Similarly, receptacle 159b is proximate the opening 169a and is created by making parallel cuts in the side 153b and bending the side 153b between the cuts inward.

A lid 160 includes a top plate 163 and a front 166, sides 164a and 164b, and a rear 165 extending downward from the top plate 163. The top plate 163 includes six sides corresponding to the six sides of the bottom plate 152, and the sides adjacent the rear 165 do not have walls extending downward therefrom and therefore form openings 168b and 169b between the rear 165 and the sides 164a and 164b, respectively. The front 166 of the lid 160 and the front 158 of the base 151 are preferably operatively connected with a hinge 161 so that the lid 160 may be pivoted about the hinge 161 to open and close the insert 150. The lid 160 is preferably slightly larger than the base 151 so that the front 166 and sides 164a and 164b overlap the front 158 and sides 153a and 153b of the base 151 when the lid 160 is closed. The lid 160 could also be a separate cover simply placed over the top of the base 151 rather than being hingedly connected to the base 151. When the lid 160 is closed, the lid 160 and the base 151 form a cavity 162, and the openings in the base and the lid proximate the sides 153a and 164a form a first opening 168 into the cavity 162 and the openings in the base and the lid proximate the sides 153b and 164b form a second opening 169 into the cavity 162.

An optional plurality of apertures 156 in the insert 150 allow for visual inspection for pests contained within the cavity 162 without having to open the lid 160.

The insert 150 could include entrance mechanisms 194 proximate the openings 168 and 169. The entrance mechanism 194 is preferably an inclined plane trap assembly, which is well known in the art. Examples of inclined plane trap assemblies that could be used are the TIN CAT™ Repeating Mouse Trap, Model M310, by Woodstream Corporation of Lititz, Pa. and the inclined plane trap assemblies shown and described in U.S. Pat. Nos. 4,103,448; 6,622,422; 6,694,669; 6,955,007; and 6,990,766; which are incorporated herein by reference. Although inclined plane trap assemblies are preferred, any suitable device that allows for the entrance of one or more pests into the insert 150 and prevents the exit of the one or more pests from the insert 150 could be used.

Figure 9:
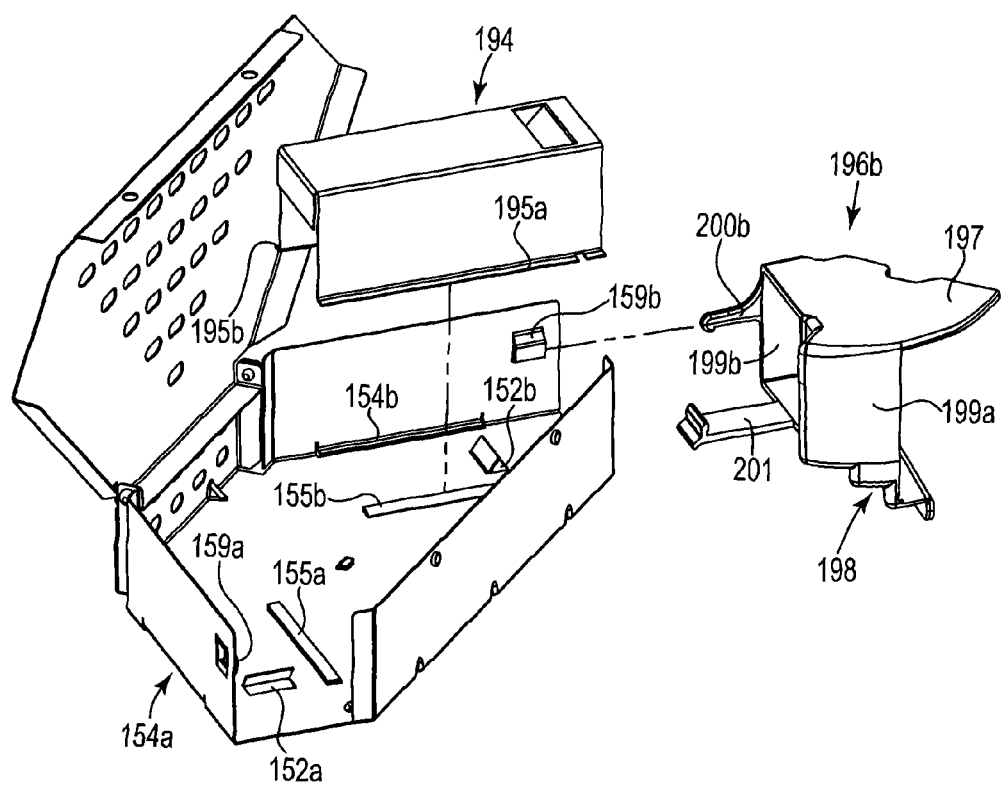
FIG. 9 is an exploded rear perspective view of the first insert shown in FIG. 7 with an opened lid and an entrance mechanism and a removable access member.

Each of the entrance mechanisms 194 include a door 194a through which pests may enter but not exit the cavity 162 proximate the openings 168 and 169. Each side of the entrance mechanism 194 proximate the bottom has a flange extending outward therefrom. As illustrated in FIG. 9, flange 195a corresponds with second tab 155b and flange 195b corresponds with first tab 154b. Similarly, for a second entrance mechanism 194, flange 195a corresponds with first tab 154a and flange 195b corresponds with second tab 155a.

The tabs of first tab 154a and second tab 155a extend inward toward one another and the tabs of first tab 154b and second tab 155b extend inward and toward one another creating channels through which the flanges 195a and 195b of the entrance mechanisms 194 may be slid to position the entrance mechanisms 194 within the cavity 162 proximate the openings 168 and 169. The entrance mechanisms 194 could also be squeezed inward so that the flanges 195a and 195b are deflected inward for insertion into the tabs. If the insert 150 is moved, the tabs keep the entrance mechanisms 194 in place within the cavity 162. If desired, the entrance mechanisms 194 may be removed by simply sliding them out through the openings 168a and 169a or squeezing the entrance mechanisms 194 inward to deflect the flanges 195a and 195b inward.

Figure 10:
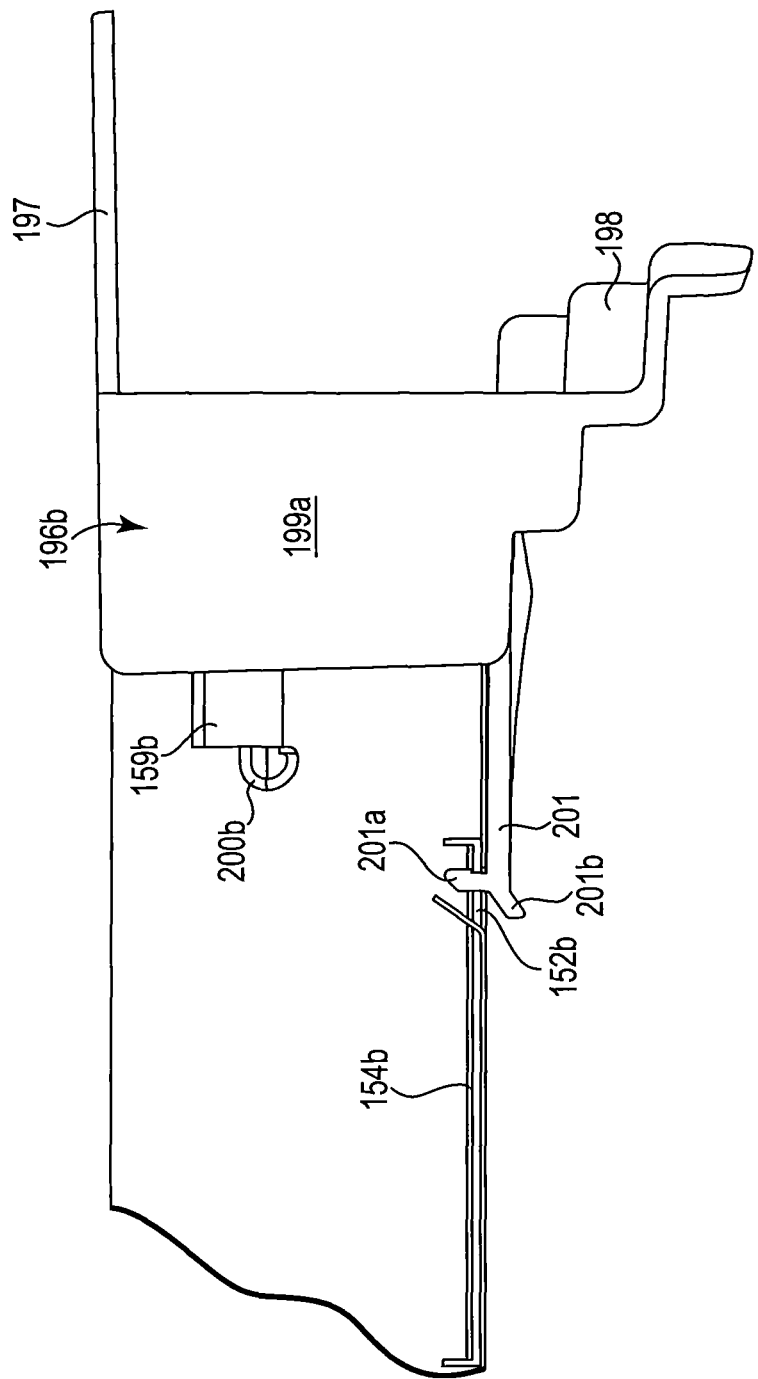
FIG. 10 is a portion of the first insert shown in FIG. 7 with the removable access member shown in FIG. 9 connected thereto.
Figure 11:
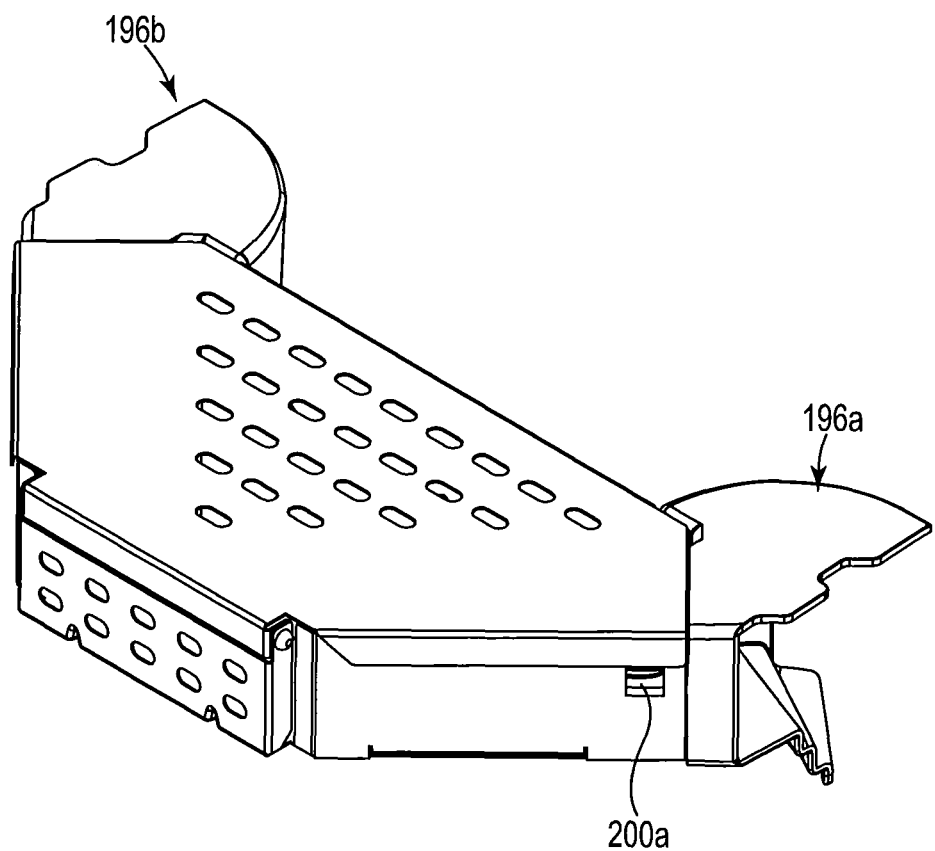
FIG. 11 is a front perspective view of the first insert shown in FIG. 7 with removable access members connected thereto.
Figure 12:
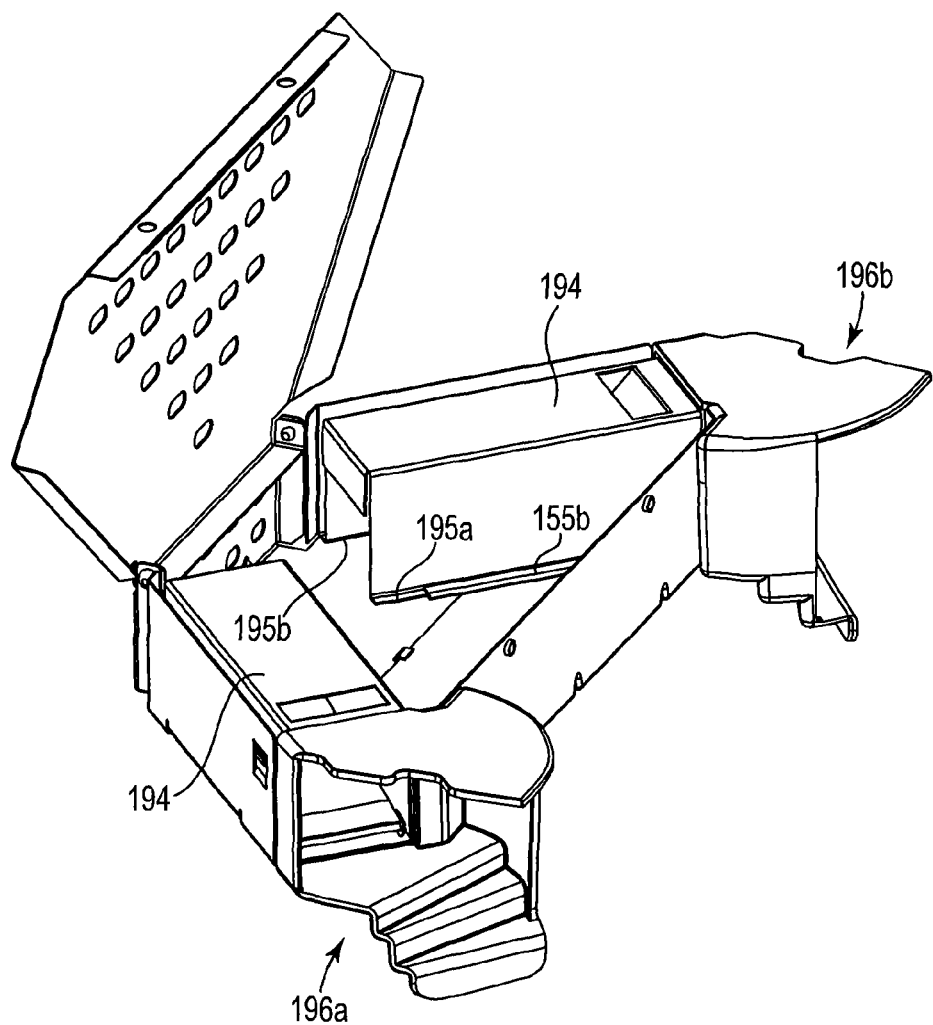
FIG. 12 is a rear perspective view of the first insert shown in FIG. 7 with an opened lid and entrance mechanisms and removable access members connected thereto.
Figure 13:
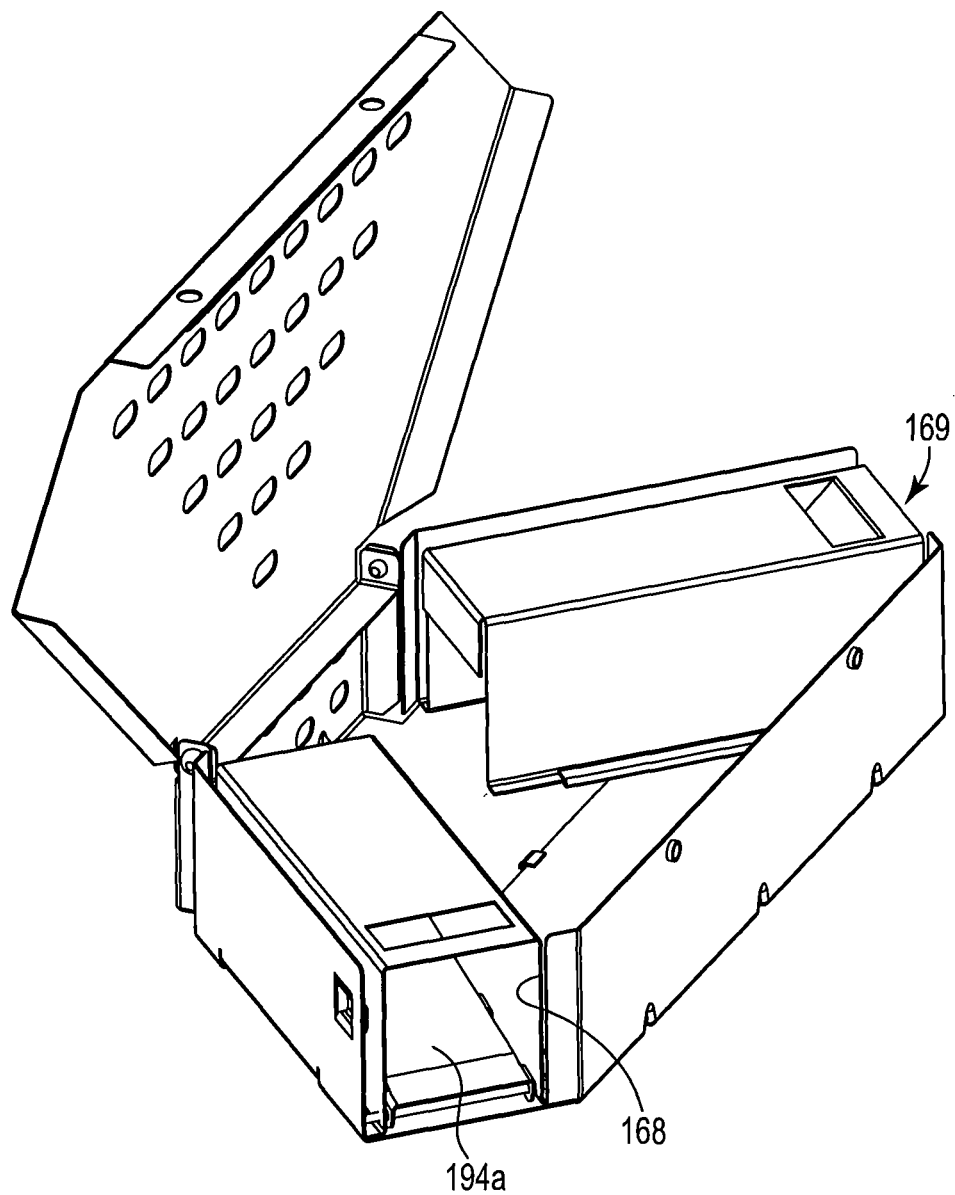
FIG. 13 is a rear perspective view of the first insert shown in FIG. 12 with the removable access members removed.

Optional access member 196a proximate opening 168 and access member 196b proximate opening 169 could be used and are easily connected and disconnected from the insert 150. As shown in FIG. 9, access member 196b includes sides 199a and 199b interconnecting a top 197 and a bottom 198. The top 197 extends outward from proximate the opening 169 like an awning to provide some protection for bottom 198, which also extends outward from proximate the opening 169. The bottom 198 preferably includes step members but could include any suitable climbing assisting member, such as a textured ramp, to assist the pests in climbing from proximate the ground or other surface upward into the opening 169. Side 199b includes a side connector 200b extending outward therefrom opposite the side from which the top 197 and the bottom 198 extend. As shown in FIGS. 9 and 10, the side connector 200b includes a hook-like end and is configured and arranged to slide into receptacle 159b. The bottom 198 includes a bottom connector 201 extending outward therefrom opposite the side from which the top 197 and the bottom 198 extend. As shown in FIGS. 9 and 10, the bottom connector 201 includes a Y-like end with a hook-like protrusion 201a extending upward and a protrusion 201b extending downward from the end. The bottom connector 201 is placed under the bottom plate 152 and the hook-like protrusion 201a extends upward to engage the receptacle 152b.

The hook-like end of the side connector 200b engages the receptacle 159b and the hook-like protrusion 201a of the bottom connector 201 engages the receptacle 152b to connect the access member 196b to the insert 150. To disconnect the access member 196b from the insert 150, the side connector 200b is deflected upward to disengage the hook-like end from the receptacle 159b and the bottom connector 201 is deflected downward to disengage the hook-like protrusion from the receptacle 152b. The protrusion 201b may be used to deflect the bottom connector 201 downward.

The access member 196a is similarly constructed for use proximate opening 168 and includes a side connector 200a configured and arranged to slide into receptacle 159a. Alternatively, the access members 196a and 196b could be connected using fasteners such as screws. The surfaces 196a and 196b provide many functions such as assisting the pests in climbing upward to the openings 168 and 169, preventing the pests from gaining access to the cavity 108 of the housing 101, and preventing contaminants from entering the cavities 162 and 108.

There are many optional configurations of the insert 150, and the insert 150 could be used with housing 101 or by itself. The insert 150 could be placed within the cavity 108 of the housing 101, which elevates the insert 150 relative to the ground or floor, and it is preferable to connect the access members 196a and 196b to the insert 150 to assist the rodents in entering the elevated insert 150. The insert 150 could include the entrance mechanisms 194 to be a multiple catch trap assembly allowing more than one pest to be trapped within the insert 150. Further, regardless if the entrance mechanisms 194 are used, a glue board or at least one snap trap may be placed within the cavity 162 of the insert 150 to trap at least one pest within the insert 150. Even further, nontoxic and toxic baits and attractants could be placed within the cavity 162 of the insert 150. The access members 196a and 196b could be disconnected from the insert 150 to use the insert 150 by itself. The shape of the insert 150 allows it to be placed against a wall with the rears 157 and 165 proximate the wall or placed in a corner with the sides 153a and 153b proximate the walls forming the corner. The insert 150 could also include a lock mechanism and be secured to the ground or the wall with a fastener to provide a tamperproof device.

Figure 4:
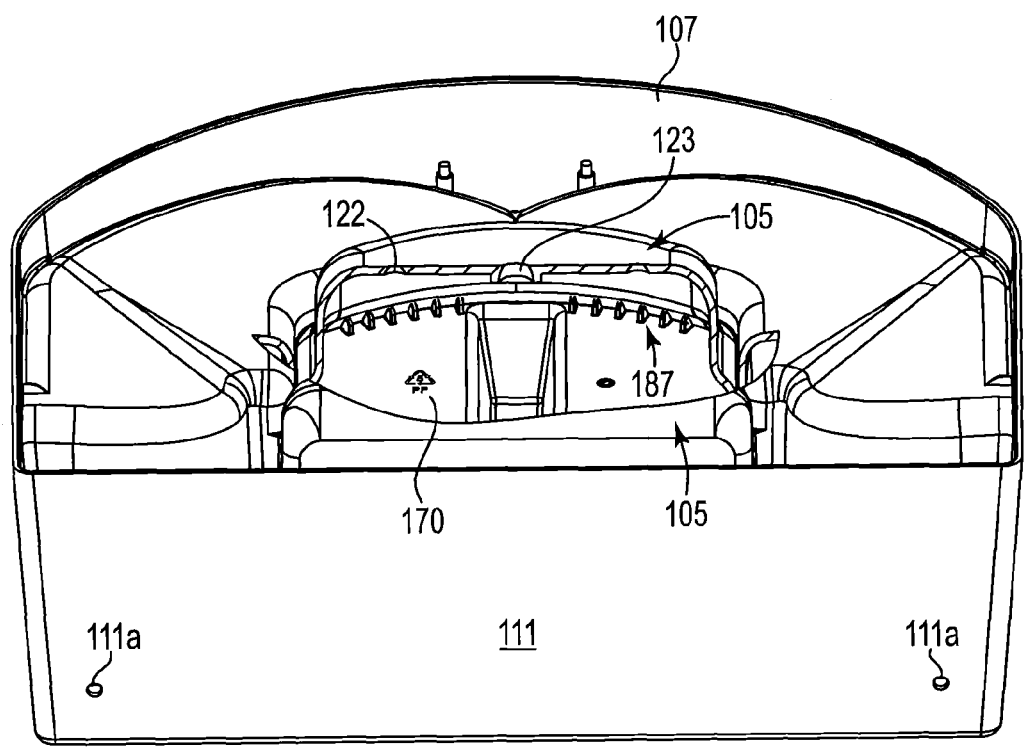
FIG. 4 is a bottom perspective view of the base shown in FIG. 3 with a portion cut away to show a bottom of a second insert.
Figure 5:
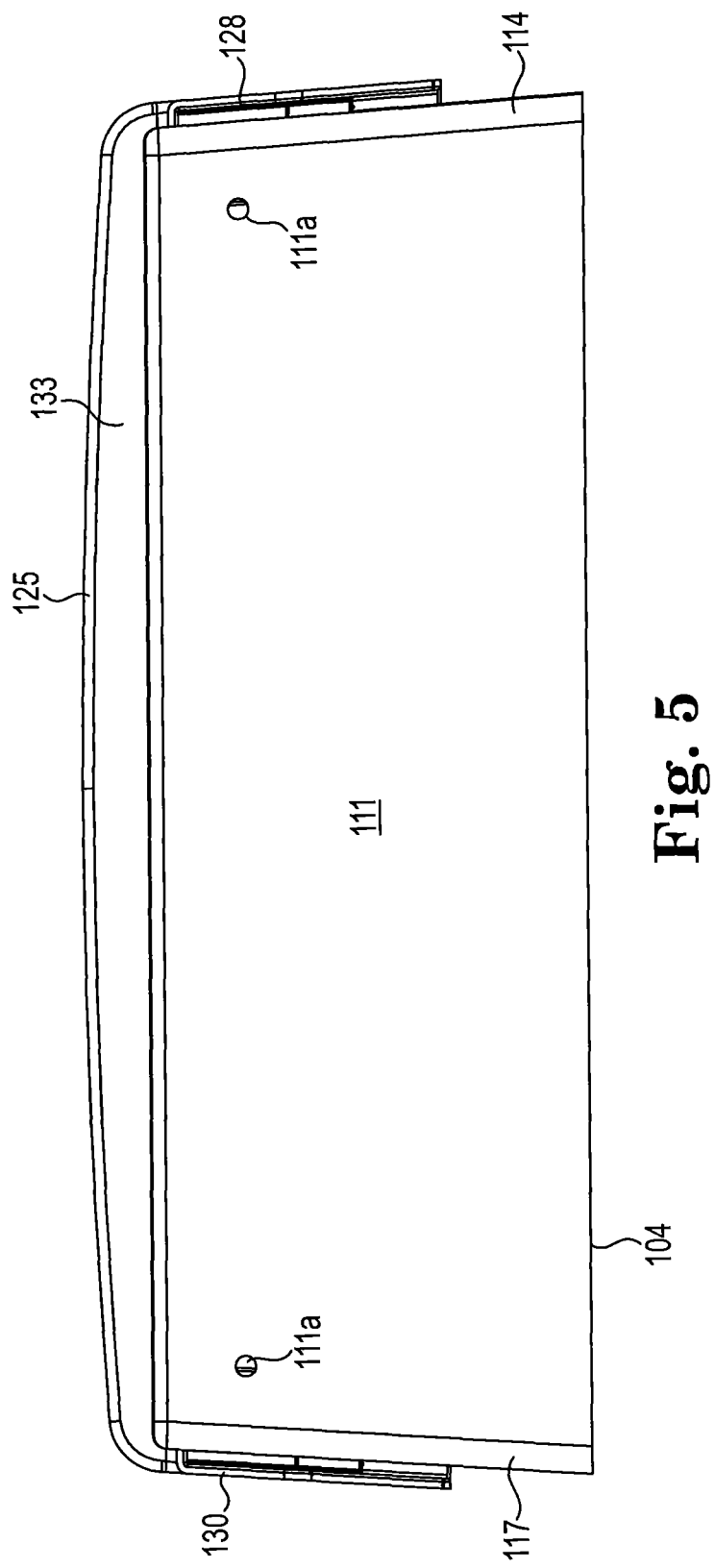
FIG. 5 is a rear view of the versatile pest station shown in FIG. 1.
Figure 18:
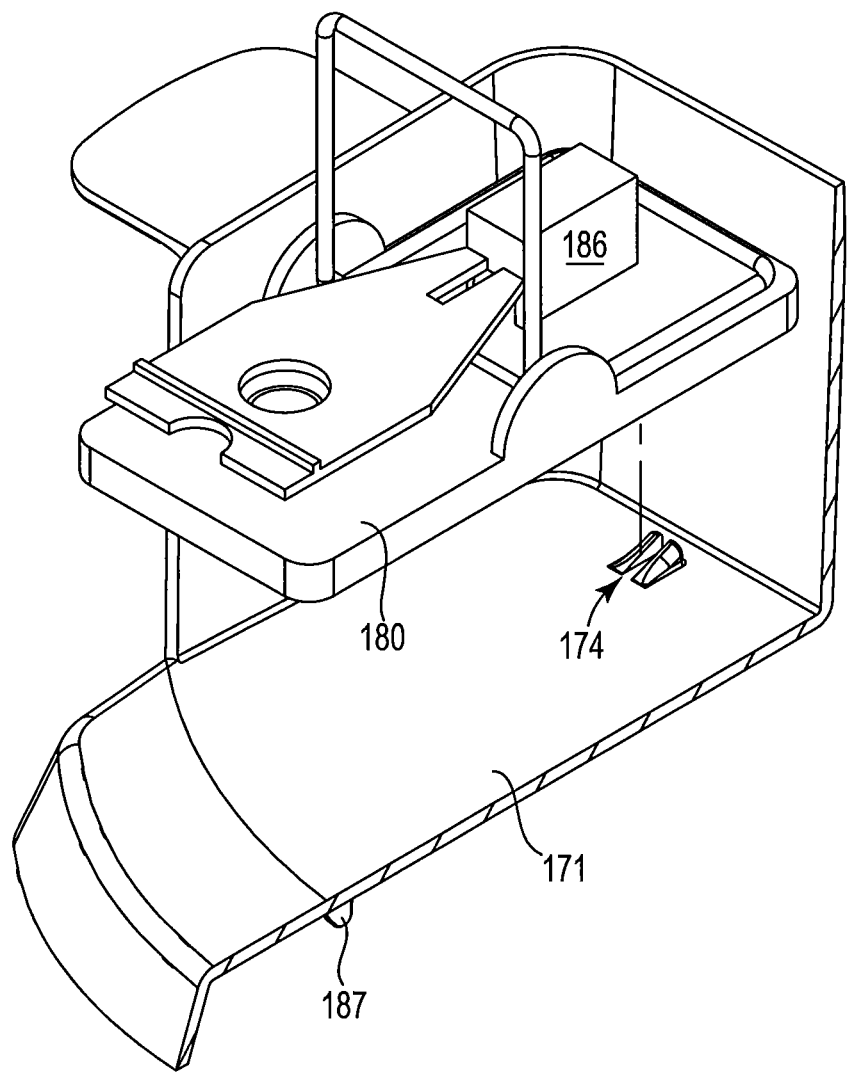
FIG. 18 is an exploded front perspective view of a portion of the second insert shown in FIG. 14 and a snap trap.

A second insert 170 includes a base 171 from which sides 175 extend upward proximate a rear 173 and sides of the base 171 defining a cavity 178 therebetween. A front portion 176 extends outward and downward from a front 172 of the base 171 and may include an optional textured surface 176a to assist the pests in climbing into the cavity 178. A partition 171a extends upward from the base 171 proximate a middle of the rear 173 from the side 175 toward a middle of the front 172. The base 171 is inclined from proximate the front 172 to proximate the rear 173. On each side of the partition 171a is a connecting member 174 that extends upward from the base 171 proximate the rear 173. Proximate the tops of the sides 175 between the front 172 and rear 173 are handles 179 extending outward therefrom. The bottom of the insert 170 preferably includes protrusions 187 extending downward from the bottom proximate the front 172 and the front portion 176. The protrusions 187 are shown in FIGS. 4, 15, and 18. The protrusions 187 extend into the cavity of the pan 105 and assist in preventing the insert 170 from sliding forward off the base 102. The insert 170 is shown in FIGS. 14-17.

Figure 19:
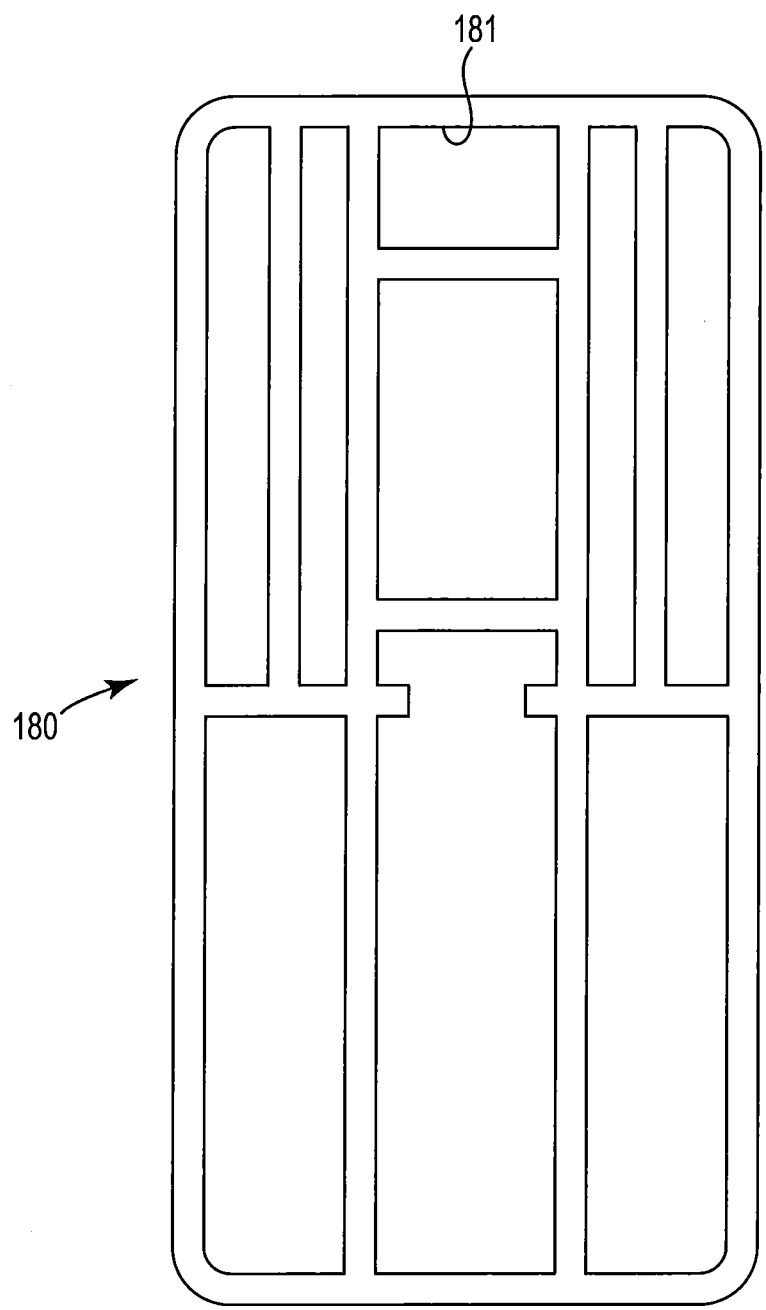
FIG. 19 is a bottom view of the snap trap shown in FIG. 18.

A snap trap 180 may be placed within the cavity 178 on each side of the partition 171a. Although many different types of snap traps could be used, an example of a suitable snap trap is the SNAP-E™ mousetrap, product code 102-0-001, manufactured by Kness Mfg. Co., Inc. located in Albia, Iowa. The bottoms of the snap traps 180 include voids 181 as shown in FIG. 19, and the connecting members 174 fit within the voids 181 as shown in FIG. 18 to assist in preventing the snap traps 180 from sliding forward off the base 171. Preferably, the connecting members 174 are angled upward toward the rear 173 so that the snap traps 180 can simply be slid backward along the connecting members 174 until the connecting members 174 fit into the voids 181. To disengage the snap traps 180 from the connecting member 174, the snap traps 180 are simply lifted upward. The connecting members 174 do not secure the snap traps 180 to the base 171 because this reduces the likelihood of activating the other snap trap when one snap trap has been activated. If the snap traps are secured to the base, the force of one snap trap being activated increases the likelihood that the other snap trap will be activated. As shown in FIG. 18, an attractant 186 could be used with the snap traps 180.

Figure 20:
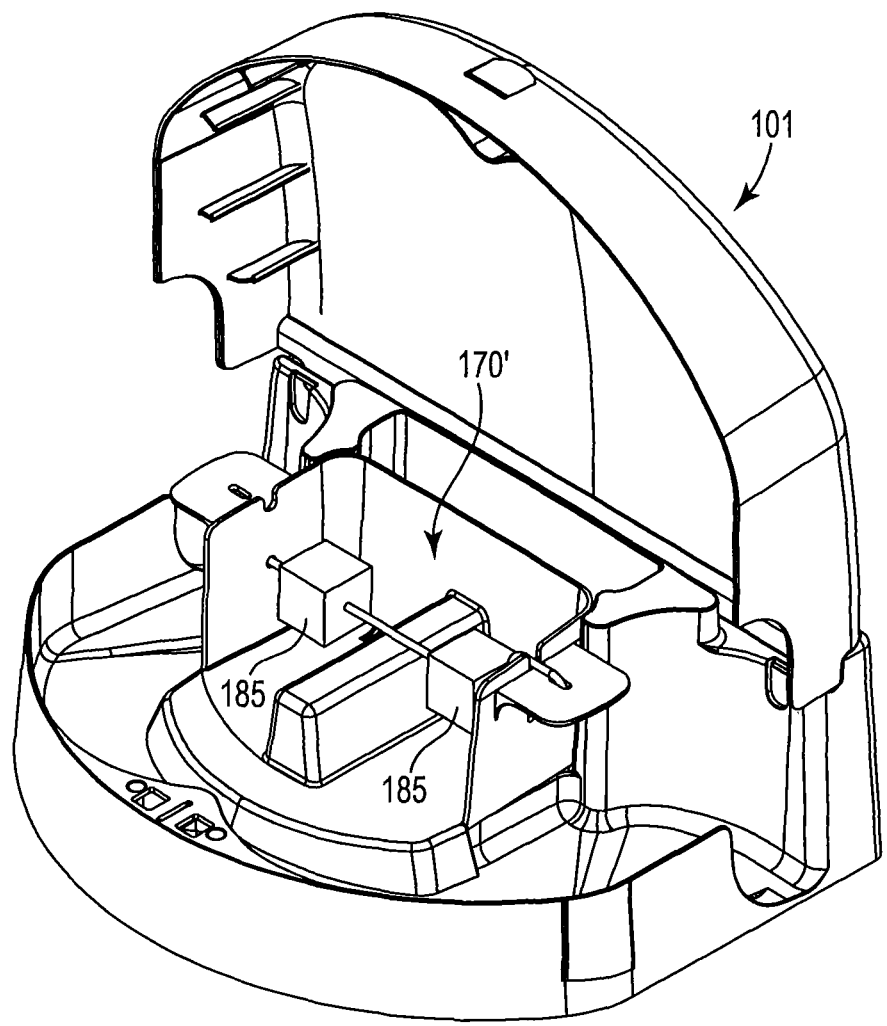
FIG. 20 is a front perspective view of the versatile pest station shown in FIG. 1 with an opened lid revealing a third insert.
Figure 21:
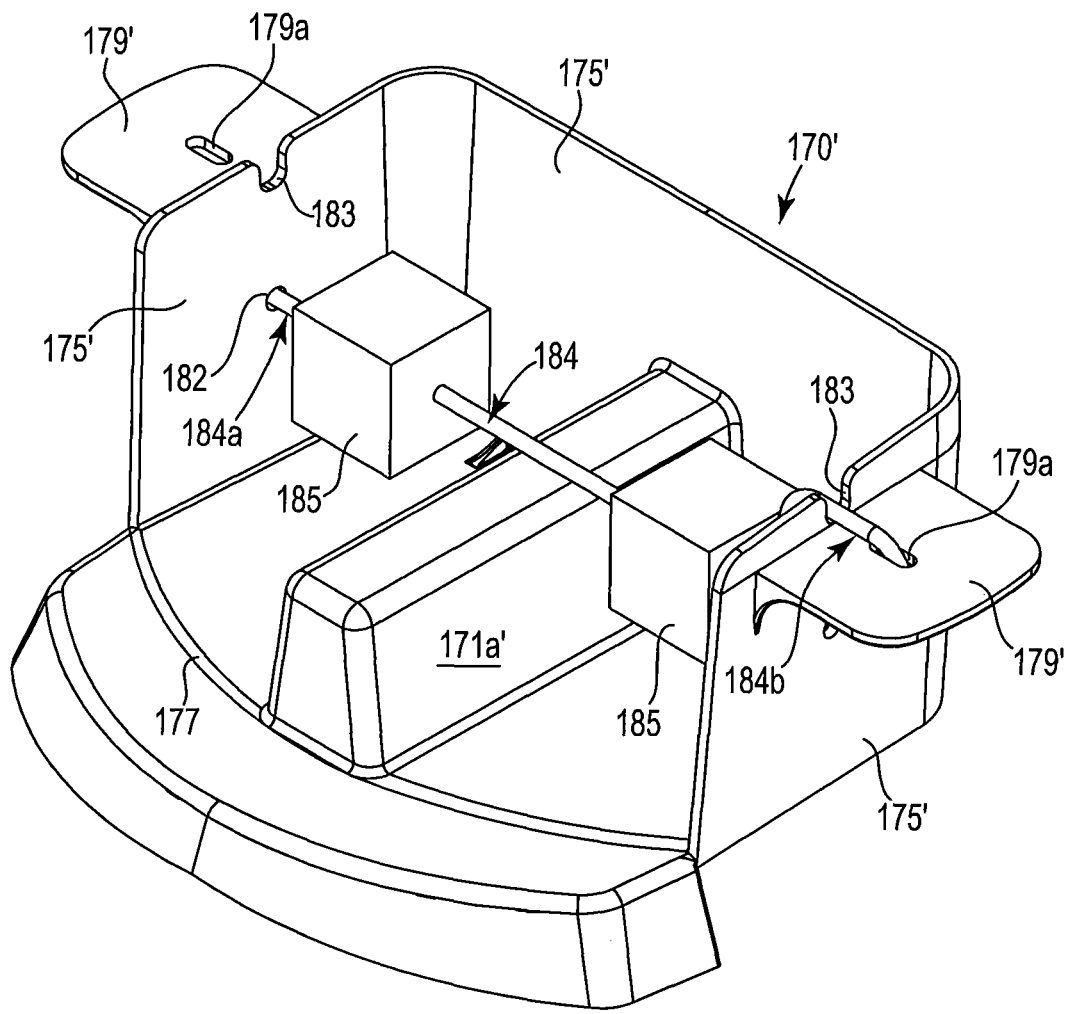
FIG. 21 is a front perspective view of the third insert shown in FIG. 20.
Figure 22:
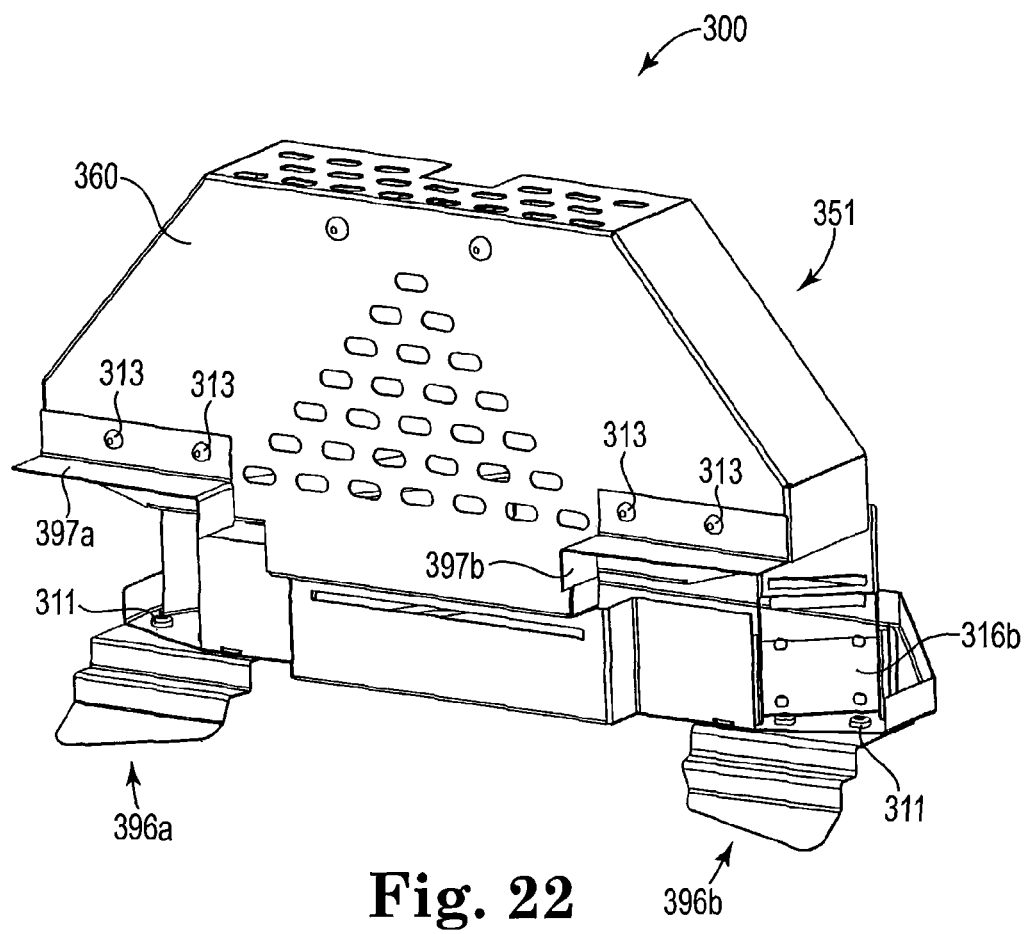
FIG. 22 is a top perspective view of a fourth insert for use with the versatile pest station shown in FIG. 1.

As shown in FIG. 21, a third insert 170' is like the second insert 170 but includes an aperture 179a in each handle 179', a notch 183 in the sides 175' proximate the handles 179' aligned with the corresponding aperture 179a, and an aperture 182 below each notch 183. A rod 184 includes a first end 184a and a second end 184b. The second end 184b is bent upward, outward, and then downward relative to the first end 184a. The first end 184a is configured and arranged to be inserted into aperture 182, and the second end 184b is configured and arranged to be inserted into the notch 183 and the aperture 179a. Bait 185 is threaded onto the first end 184a of the rod 184 and positioned on the rod 184 so that a piece of bait 185 is on each side of the partition 171a'. Although the rod 184 is shown in a horizontal orientation, a rod could be oriented vertically on one or both sides of the partition 171a'. For example, a rod could be inserted into an aperture in the base of the insert, preferably having mating threads, and the bait could simply be threaded onto the other end of the rod. Alternatively, bait could simply be placed on the base on each side of the partition, but then the pests could take the entire bait out of the insert. By being threaded onto the rod, as the pests consume the bait, the bait provides evidence of pests. Alternatively, a connecting member 177, which is a ledge-like protrusion extending upward from the base 171 proximate the front 172 and the front portion 176 as shown in FIGS. 20-21, could be used to prevent the snap traps or the bait from sliding forward off the base 171. Also, a glue board could be placed on the base within the cavity as well as water and one to two snap traps.

A fourth insert 300 is shown in FIGS. 22-26 and is similar to insert 150. Because these inserts are similar, only the significant differences of insert 300 will be described herein. Insert 300 includes access members 396a and 396b with apertures 312a and 312b, respectively, through which fasteners 311 are inserted to secure them to the base 351 proximate the openings 368a and 369a. Top portions 397a and 397b are secured with fasteners 313 to the lid 360 by inserting the fasteners 313 through apertures 314a and 314b in the lid 360 proximate the openings 368b and 369b. If it is desired to use the insert 300 by itself, the access members 396a and 396b may be removed by simply removing the fasteners 311.

Optionally, the top portions 397a and 397b may also be removed by simply removing the fasteners 313.

Figure 23:
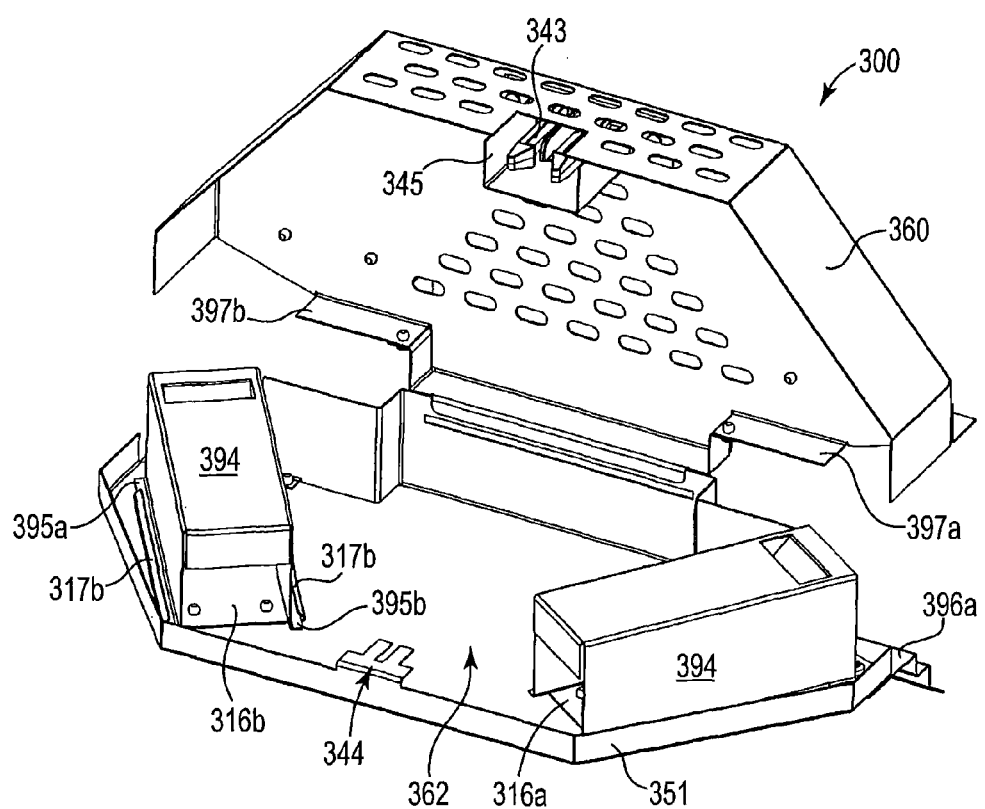
FIG. 23 is a front perspective view of the insert shown in FIG. 22 with an opened lid.
Figure 24:
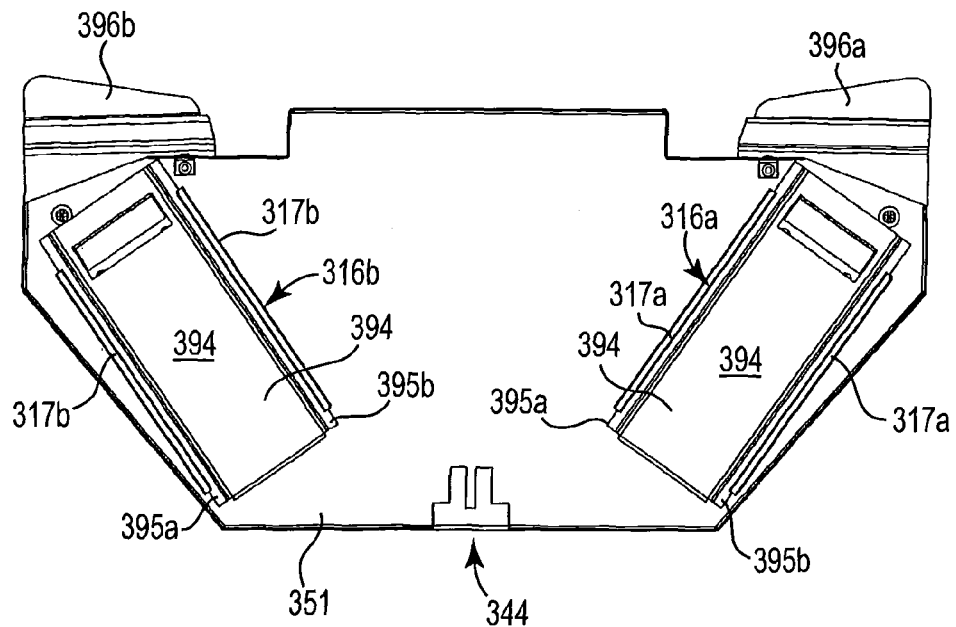
FIG. 24 is a top view of the insert shown in FIG. 22 with the lid removed.
Figure 25:
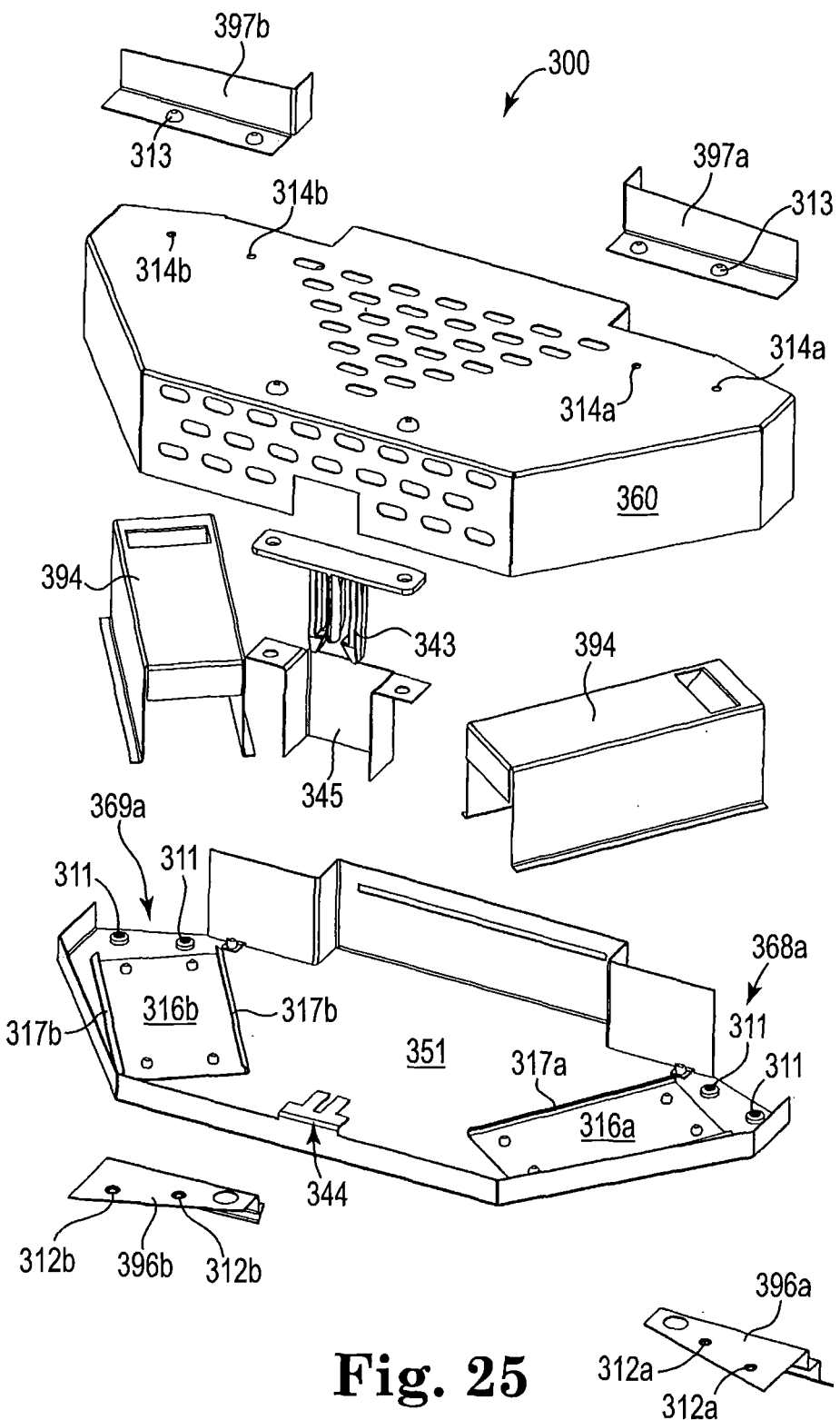
FIG. 25 is an exploded front perspective view of the insert shown in FIG. 22.

The insert 300 also includes entrance mechanisms 394 with flanges 395a and 395b that slidably connect to the base 351 by sliding into brackets 316a and 316b mounted to the base 351 proximate the openings 368a and 369a. The brackets 316a and 316b are rectangular plate members with opposing sides bent upward thereby creating a channel through which the entrance mechanisms 394 are slid. The bent sides 317a and 317b of the brackets 316a and 316b engage the flanges 395a and 395b of the entrance mechanisms 394 as shown in FIGS. 23 and 24.

A lock mechanism 342, similar to lock mechanism 142, secures the lid 360 to the base 351. The base 351 includes a female portion 344 configured and arranged to receive a male portion 343 connected to the lid 360. A shield 345 may also be connected to the lid 360 to protect the male portion 343 from contact by pests contained within the cavity 362.

Figure 6:
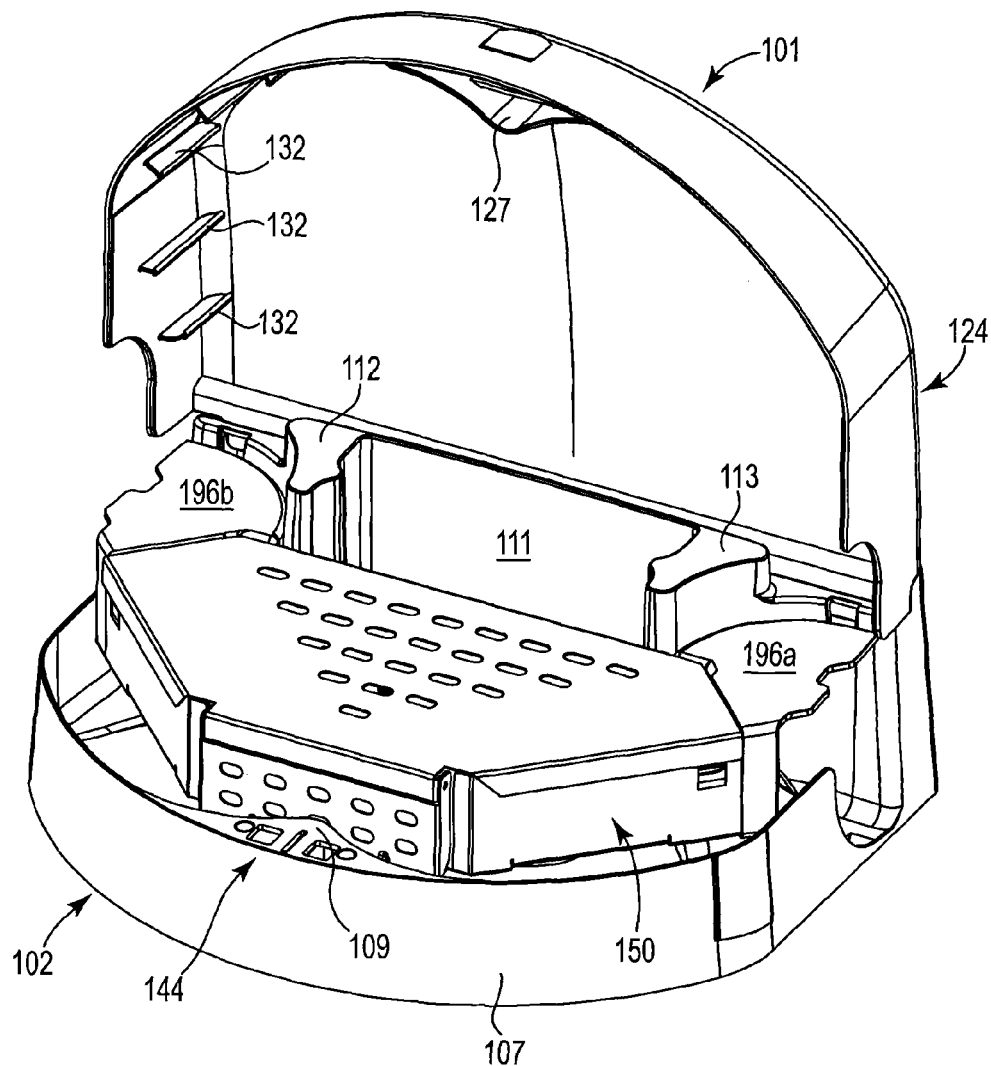
FIG. 6 is a front perspective view of the versatile pest station shown in FIG. 1 with an opened lid revealing a first insert.
Figure 7:
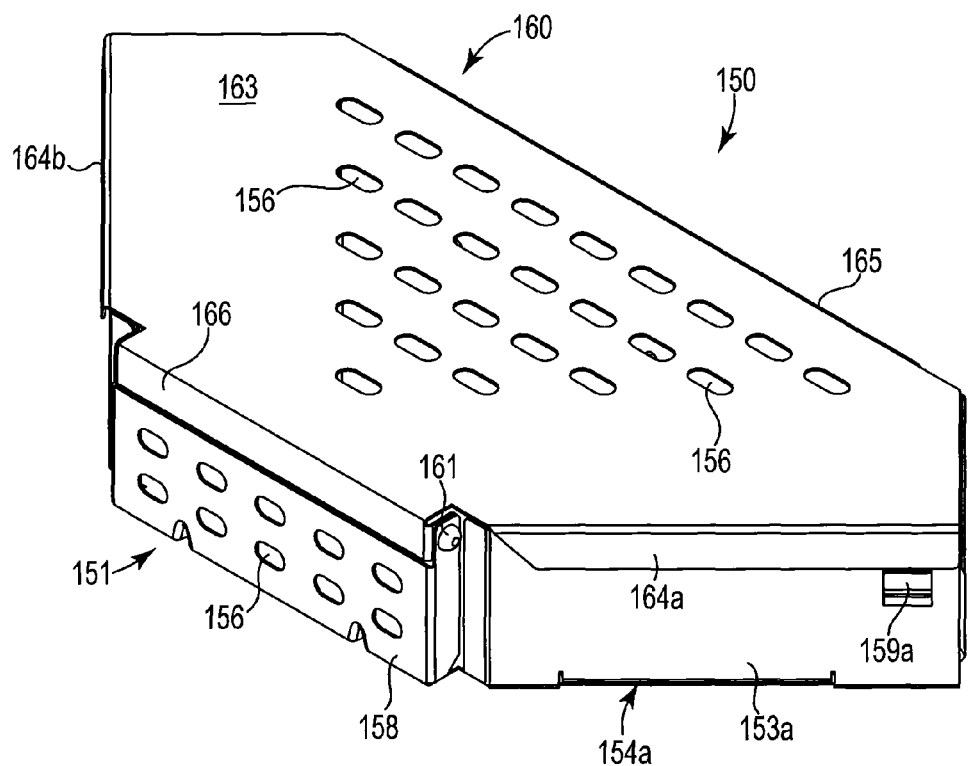
FIG. 7 is a front perspective view of the first insert shown in FIG. 6.
Figure 8:
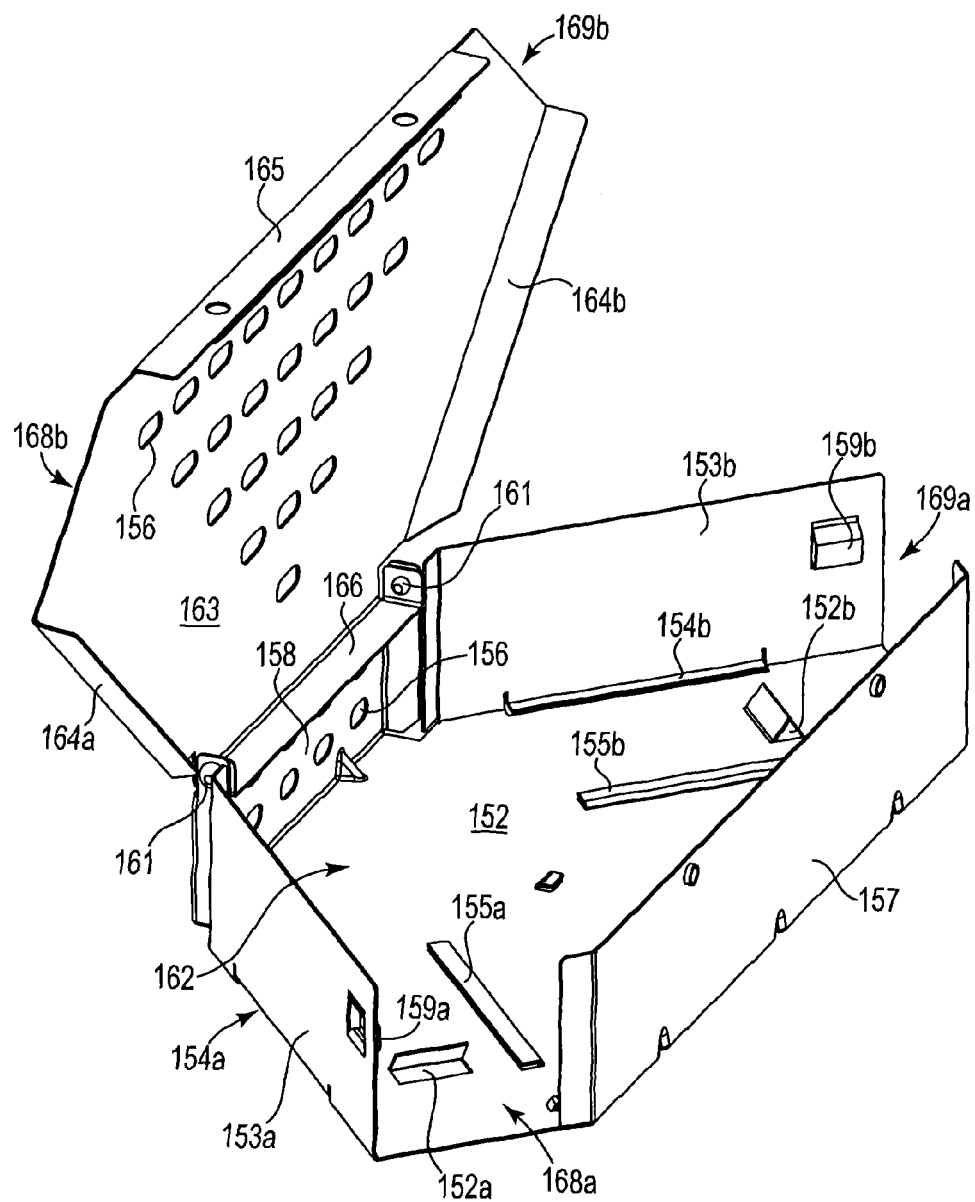
FIG. 8 is a side perspective view of the first insert shown in FIG. 7 with an opened lid.

The housing 101 may be used with any of these inserts. For insert 150, as shown in FIG. 6, the rears 157 and 165 of the insert 150 are positioned proximate protrusions 112 and 113 of the rear wall 111 of the base 102 and the fronts 158 and 166 of the insert 150 are positioned proximate the protrusion 109 of the front wall 107 of the base 102. The access members 196a and 196b are positioned proximate the inclined passageways 119 and 116, respectively. The elevated platform 106 elevates the base 151 of the insert 150 relative to the ground or other surface, and the inclined passageways 116 and 119 or the bottoms 198 of the access members 196a and 196b (if used) allow the pest to climb up to the elevated base 151. If the access members 196a and 196b are not used, the inclined passageways 116 and 119 could be textured. When the lid 124 of the housing 101 is closed, the protrusions 132 are proximate the lid 160 of the insert 150, and could contact the lid 160, to sandwich the insert 150 between the base 102 and the lid 124 to prevent the insert 150 from moving too much vertically within the cavity 137. The protrusions 109, 112, and 113 prevent the insert 150 from moving too much laterally within the cavity 137. The pests may access the cavity 162 of the insert 150 by entering the openings 138 and 139, climbing up the inclined passageways 116 and 119 or the bottoms 198 of the access members 196a and 196b (if used), through the doors 194a of the entrance mechanisms 194 (if used), and into the cavity 162. Bait, glue boards, snap traps, and other devices may be positioned within the cavity 162.

Similarly, for insert 300, the rears of the base 351 and the lid 360 also include a bump-out portion that fits between the protrusions 112 and 113, which also assists in preventing lateral movement of the insert 300 within the cavity 137.

Figure 14:
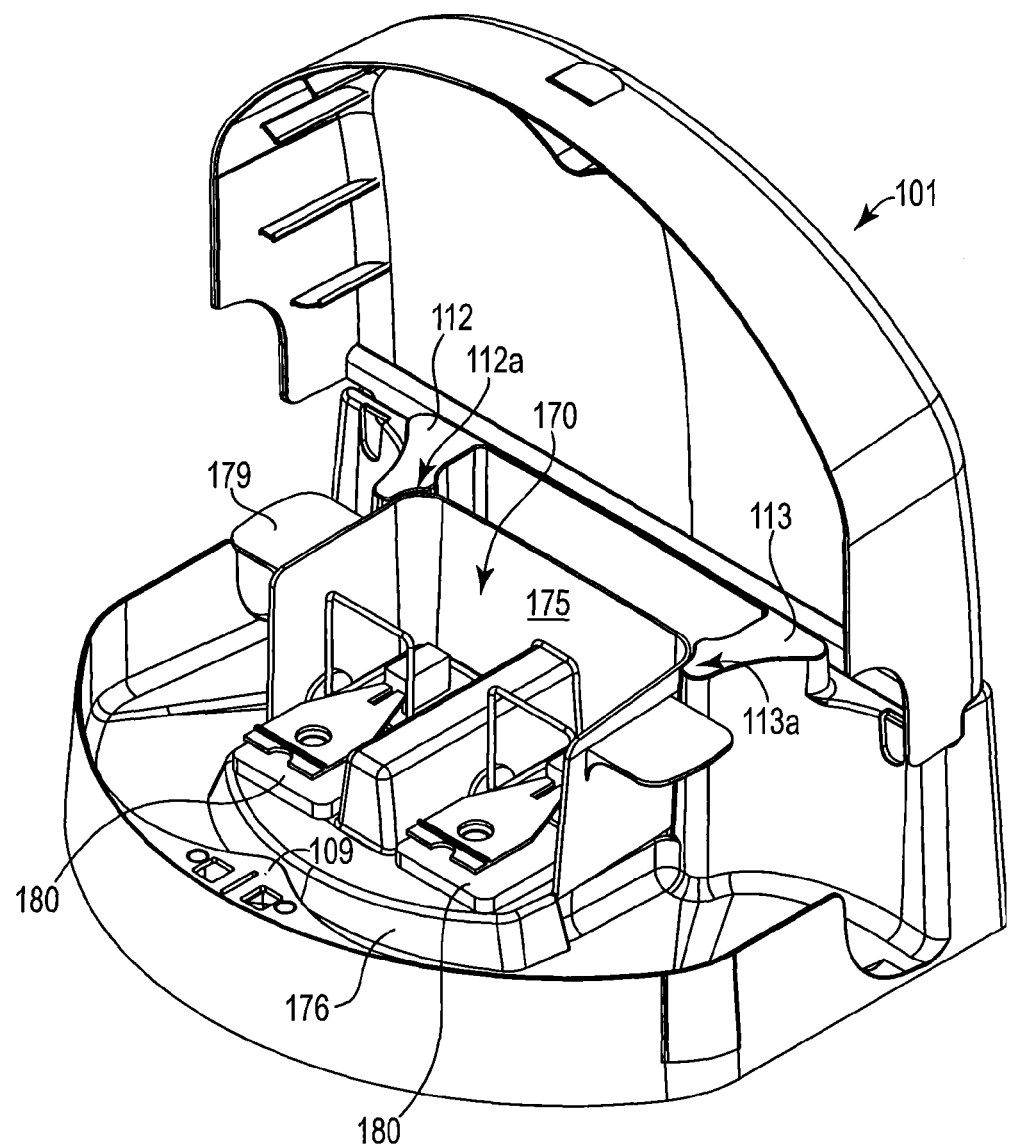
FIG. 14 is a front perspective view of the versatile pest station shown in FIG. 1 with an opened lid revealing a second insert.
Figure 15:
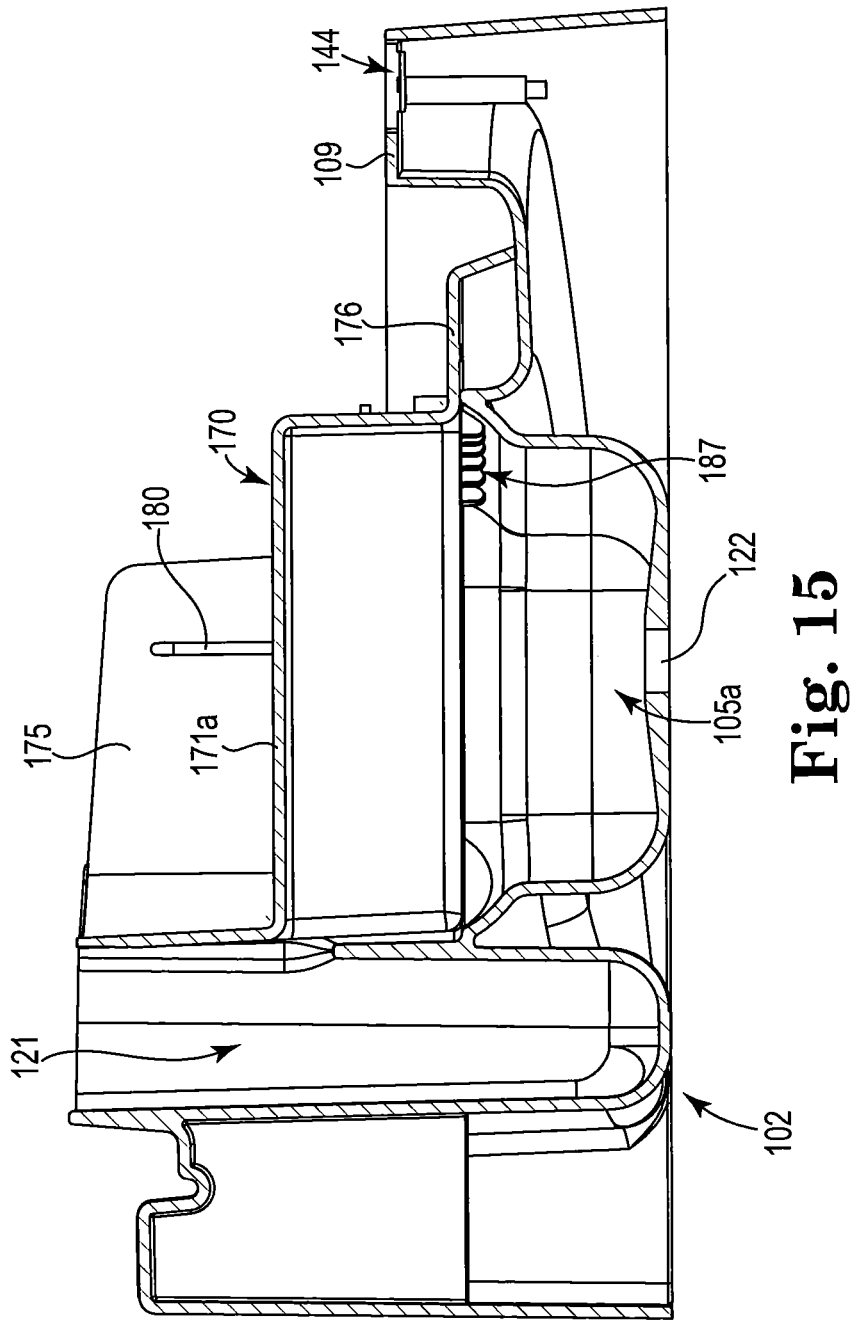
FIG. 15 is a cross-section view of the second insert positioned in a base of the versatile pest station shown in FIG. 14.
Figure 16:
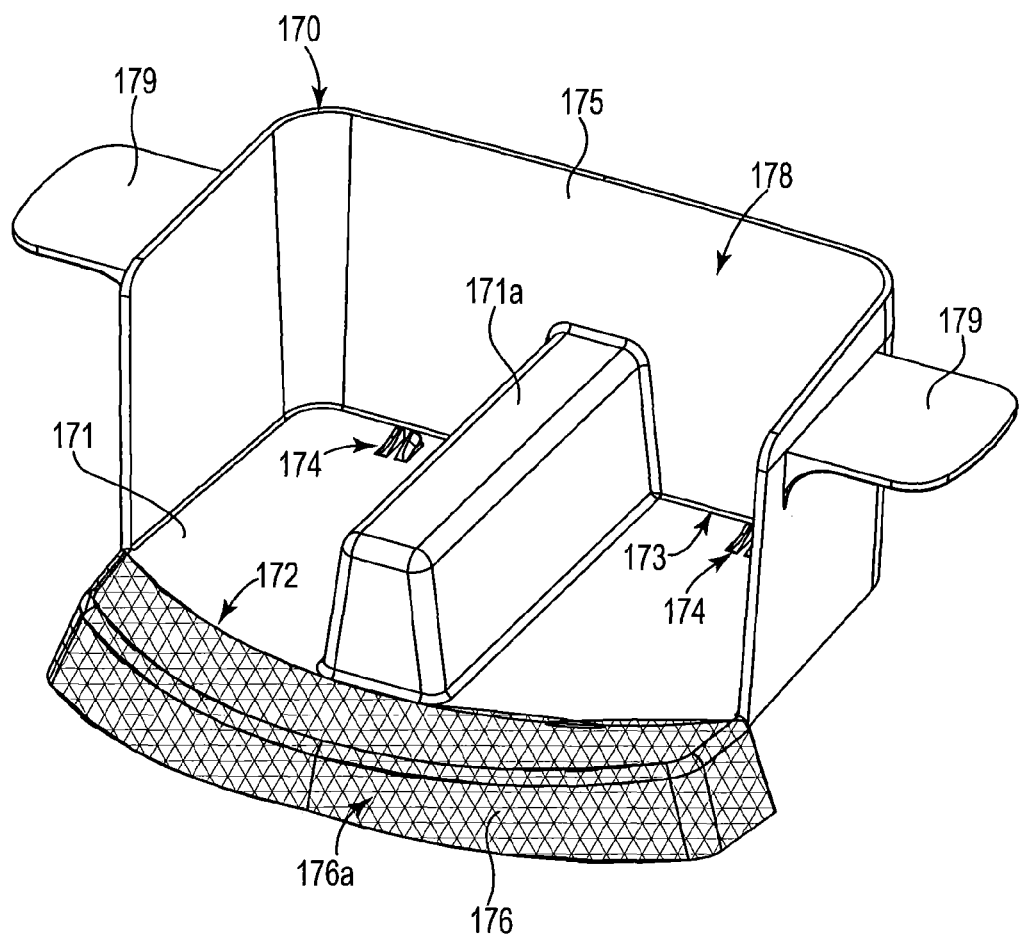
FIG. 16 is a front perspective view of the second insert shown in FIG. 14.
Figure 17:
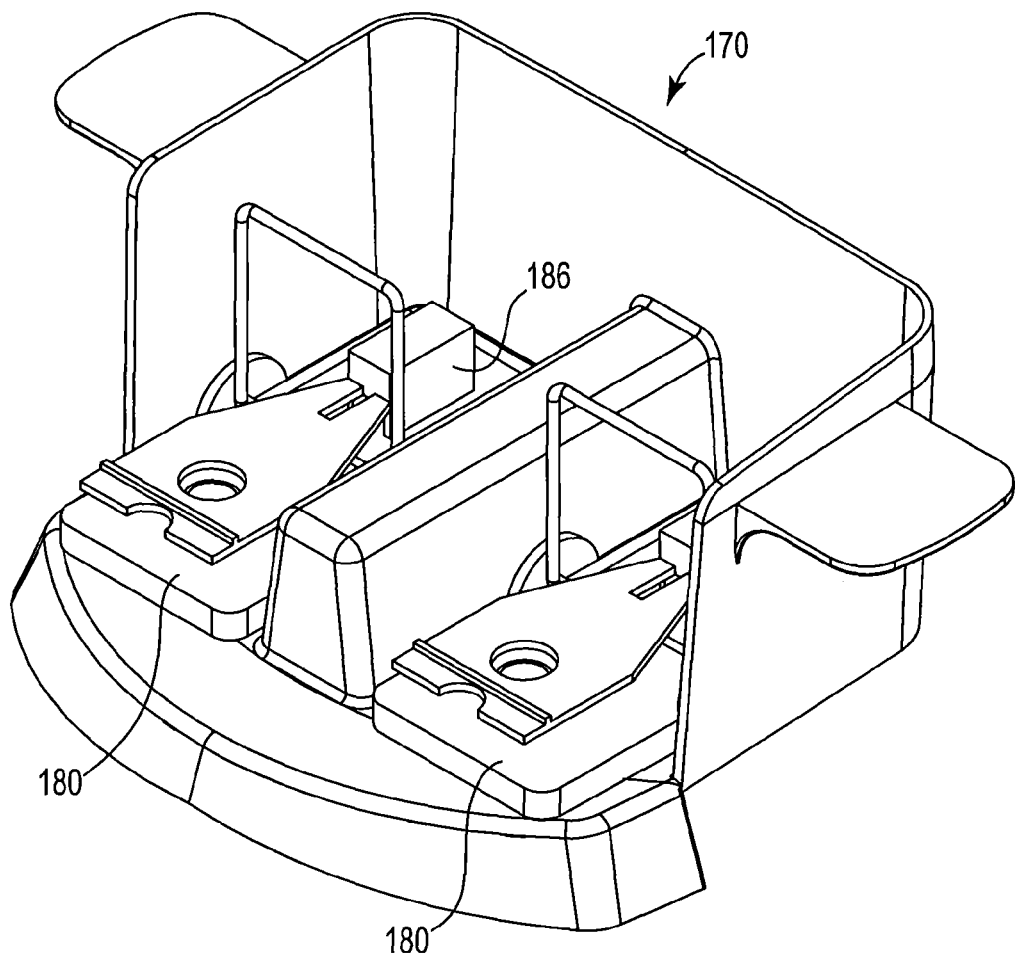
FIG. 17 is a front perspective view of the second insert shown in FIG. 14 with snap traps positioned therein.

For insert 170, as shown in FIGS. 14 and 15, the handles 179 may be used to place the insert 170 into and lift the insert 170 out of the cavity 137 of the housing 101. The rear 173 is positioned proximate the rear wall 111 between protrusions 112 and 113 of the housing 101, and the protrusions 112 and 113 include curved surfaces 112a and 113a corresponding to the curved corners of the sides 175. The front portion 176 is positioned proximate the protrusion 109, and the front portion 176 prevents pests from accessing the cavity 105a of the pan 105 under the insert 170. Insert 170' fits similarly within the housing 101 as shown in FIG. 20.

The versatile pest station includes a housing that supports various inserts including traps or monitoring devices. Suitable trapping devices include single traps, multi-catch traps, snap traps, glue boards, drowning traps, electrocution traps, live traps, snares, and other trapping devices that will be recognized by persons having ordinary skill in the art. Suitable monitoring devices include food-based blocks made without pesticide active ingredients, IR detectors, motion detectors, sound detectors, mechanical sensing plates and other monitoring devices that will be recognized by persons having ordinary skill in the art. The inserts may also or instead contain a pesticide bait or baits.

The inserts desirably are easily installed in and removed from a bait station, desirably without requiring tools. The inserts desirably include a housing, base, mounting plate, shoe or other surface which mates with a complementary pan, platform, support, shoe, detent, mount, latch, receptacle or other receiving feature in the station housing to permit the inserts to be properly mounted and oriented in the station housing without being susceptible to loose or improper installation.

For example, the inserts may be adapted to fit into an existing station housing such as the CHECKPOINT™ bait station from Ecolab Inc. or in stations available from other suppliers. The inserts or their mounting surfaces desirably are configured so that the inserts may also stand alone as a potential indoor trap or monitoring device when placed on a floor or other horizontal surface, without being susceptible to tipping, rollover, or other misalignment when in use. The inserts may be equipped with optional lids. The lids or inserts may include an optional lock to hold the inserts closed or to secure them in the station housings.

The CHECKPOINT™ bait station, which is a generally D-shaped plastic bait station, desirably has rounded edges to discourage chewing and a pivotable or removable lid to permit easy access. The bait station also desirably is equipped with a lock to control such access. Pest entrances are located on opposite sides of the station, preferably near one edge or wall.

Various inserts could be used with the CHECKPOINT™ bait station. A first insert could be a "box" like structure with a cover that can be completely removed from the insert base when the bait station lid has been removed. Two mouse traps are located inside the insert, and the insert has readily removable walkway planks which provide a path for pests to travel up to the insert level. A second insert could be similar to the first insert but has a hinge which connects the cover to the base.

Both the first and second inserts can if desired stand alone (e.g., outside the bait station) to act as an indoor trap. When installed in the bait station, the inserts desirably are elevated above the bait station entrance and thus have better protection against weather ingress and standing water near the bait station entrance than would be the case if the inserts were at entrance level. When the bait station is closed, the inserts are not accessible by larger non-targeted pests, animals, and children.

A third insert, which is also box like, could contain a multi-catch trap with two one-way entrance tunnels. Perforations permit a viewer to determine if the trap contains any pests without having to open the insert. Optionally removable steps are provided to guide pests up into the insert. Optionally removable shields block off open areas within the bait station and prevent pests from maneuvering around the insert.

A fourth insert could be a tray like container on which snap traps may be positioned, on which bait may be positioned, or onto which a bait rod may be mounted.

The inserts may have any convenient size. The box like inserts could be about 5.5" deep by 12" wide by 2.25" tall. The inserts may be made from a variety of materials including plastic, wood, paper, and metal, with sheet metal being preferred.

The inserts may be evaluated at one or more test facilities. Candidate test facilities should be assessed for evidence of pest activity around the facility exterior. Existing CHECKPOINT™ bait stations at the facility could be used to house the various inserts, and one or two CHECKPOINT™ bait stations equipped with DETEX™ pesticide blocks could be used for monitoring purposes. For rat and mice monitoring, the stations should be located around trash receptacles. Active baits should be removed from remaining stations in and around the facility and replaced with DETEX™ blocks for the duration of the evaluation. All stations and station settings could be identified on an equipment location diagram. Stations should be inspected on a weekly basis. Interior multiple catch traps could be positioned at all entry points into the facility and inspected at intervals to evaluate prevention of pest entrance into the test facility. A count should be taken of the number of trapped pests, their body length and species in the CHECKPOINT™ bait stations and in the interior multiple catch traps. A count should also be taken of the number of stations or interior multiple catch traps having a missed catch (sprung snap trap, glue board with fur, etc.). Other pest activity in the stations or interior multiple catch traps (e.g. droppings, gnawing on the DETEX™ blocks, etc.) could also be monitored. A similar facility near the test facility could be evaluated for comparative, subjective observations. This similar facility would not have the CHECKPOINT™ bait stations with multipurpose inserts but would serve as a control showing relative pest activity in the vicinity. A record could also be made regarding user interface factors such as the time it takes to service an insert, ease of use, damage, etc.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An insert for use with a pest station, the pest station including a station housing having a station cavity, comprising:
   an insert housing including a base, a lid, and an opening, the base including a base side and a base bottom, the base and the lid forming an insert cavity configured and arranged to contain a pest, the opening providing access to the insert cavity, the base side including a side receptacle within the insert cavity, the base bottom including a bottom receptacle;
   an entrance mechanism proximate the opening, the entrance mechanism allowing entrance into the insert cavity and preventing exit out of the insert cavity;
   an access member including a side connector extending outward therefrom configured and arranged to engage the side receptacle within the insert cavity and a bottom connector extending outward therefrom configured and arranged to engage the bottom receptacle, the access member being releasably connectable to the insert housing proximate the opening such that the side connector extends through the opening of the insert housing when the side connector engages the side receptacle, at least a portion of the access member extending outward externally from the insert housing proximate the opening, the access member including a bottom portion extending below the base bottom when connected to the insert housing; and
   wherein the insert housing is used individually by detaching the access member from the insert housing and positioning the base bottom on a surface, and wherein the insert housing including the access member is used with the pest station by placing the insert housing within the station cavity thereby elevating the base bottom relative to the surface and positioning the bottom portion of the access member proximate the surface.

2. The insert of claim 1, wherein the side connector and the bottom connector include hook-like protrusions configured and arranged to engage the respective receptacles.

3. The insert of claim 1, wherein the side receptacle is formed by the base side of the insert housing.

4. The insert of claim 3, wherein the side connector extends through the side receptacle.

5. The insert of claim 4, wherein the side connector includes a hook-like protrusion configured and arranged to engage the side receptacle.

6. The insert of claim 1, wherein the bottom receptacle includes an aperture.

7. The insert of claim 6, wherein the bottom connector includes a hook-like protrusion configured and arranged to extend through the aperture.

8. A pest station and an insert for use with the pest station, comprising:
   a station housing having a station cavity;
   an insert housing including a base with a base bottom, a lid, and an opening, the base and the lid forming an insert cavity configured and arranged to contain a pest, the opening providing access to the insert cavity;
   an entrance mechanism proximate the opening, the entrance mechanism allowing entrance into the insert cavity and preventing exit out of the insert cavity;
   an access member releasably connectable to the insert housing proximate the opening, at least a portion of the access member extending outward externally from the insert housing proximate the opening, the access member including a bottom portion extending below the base bottom when connected to the insert housing; and
   wherein the insert housing is used individually by detaching the access member from the insert housing and positioning the base bottom on a surface, and wherein the insert housing including the access member is used with the pest station by placing the insert housing and the access member within the station cavity thereby elevating the base bottom relative to the surface and positioning the bottom portion of the access member proximate the surface, the insert housing and the access member being contained within the station housing.

9. The pest station and insert of claim 8, wherein the insert housing includes a plurality of apertures providing visual indication of a pest contained within the insert cavity without opening the lid.

10. The pest station and insert of claim 8, wherein a glue board is positioned within the insert cavity proximate the entrance mechanism.

11. The pest station and insert of claim 8, wherein the access member is attached to the insert housing when the insert housing is placed within the station cavity.

12. The pest station and insert of claim 8, wherein the entrance mechanism is removable.

13. The pest station and insert of claim 8, wherein the access member includes sides configured and arranged to prevent direct access to the station cavity thereby directing a pest to the insert cavity within the station cavity.

14. The pest station and insert of claim 8, wherein the access member includes a climbing assisting member to assist the pest in climbing from proximate a surface to the opening.

15. The pest station and insert of claim 8, further comprising a bottom connector and a side connector extending outward from the access member and being configured and arranged to releasably connect to the insert housing.

16. The pest station and insert of claim 15, further comprising a bottom receptacle and a side receptacle of the insert housing proximate the opening, the bottom receptacle configured and arranged to receive the bottom connector and the side receptacle configured and arranged to receive the side connector.

17. The pest station and insert of claim 16, wherein the bottom connector and the side connector include hook-like protrusions configured and arranged to engage the receptacles.

18. A pest station and an insert for use with the pest station, comprising:
   a station housing having a station cavity;
   an insert housing including a base, a lid, and an opening, the base and the lid forming an insert cavity configured and arranged to contain a pest, the base including a bottom receptacle and a side receptacle proximate the opening, the opening providing access to the insert cavity;
   an entrance mechanism proximate the opening, the entrance mechanism allowing entrance into the insert cavity and preventing exit out of the insert cavity;
   an access member including a bottom connector and a side connector extending outward therefrom configured and arranged to releasably connect to the bottom receptacle and the side receptacle of the insert housing proximate the opening, at least a portion of the access member extending outward externally from the insert housing proximate the opening; and
   wherein the insert housing is used individually by detaching the access member from the insert housing and wherein the insert housing including the access member is used with the pest station by placing the insert housing and the access member within the station cavity, the insert housing and the access member being contained within the station housing.

19. The pest station and insert of claim 18, wherein the bottom connector and the side connector include hook-like protrusions configured and arranged to engage the receptacles.

20. The pest station and insert of claim 18, wherein the access member includes sides configured and arranged to prevent direct access to the station cavity thereby directing a pest to the insert cavity within the station cavity.

* * * * *